(12) United States Patent
Munson et al.

(10) Patent No.: US 10,523,053 B2
(45) Date of Patent: Dec. 31, 2019

(54) SPORT BALL INDUCTIVE CHARGING METHODS AND SYSTEMS

(71) Applicant: adidas AG, Herzogenaurach (DE)

(72) Inventors: Ian M. Munson, Portland, OR (US); Charles S. Mauro, Jr., Portland, OR (US); Carl B. Van Wormer, Hillsboro, OR (US); James D. Seymour, Hillsboro, OR (US)

(73) Assignee: adidas AG, Herzogenaurach (DE)

( * ) Notice: Subject to any disclaimer, the term of this patent is extended or adjusted under 35 U.S.C. 154(b) by 0 days.

(21) Appl. No.: 14/286,589

(22) Filed: May 23, 2014

(65) Prior Publication Data

US 2015/0340904 A1 Nov. 26, 2015

(51) Int. Cl.
| | |
|---|---|
| *H02J 50/12* | (2016.01) |
| *H02J 7/00* | (2006.01) |
| *A63B 43/00* | (2006.01) |
| *H02J 5/00* | (2016.01) |
| *H02J 7/02* | (2016.01) |
| *H02J 17/00* | (2006.01) |

(Continued)

(52) U.S. Cl.
CPC ............. *H02J 50/12* (2016.02); *A63B 43/00* (2013.01); *A63B 47/00* (2013.01); *H02J 5/005* (2013.01); *H02J 7/0057* (2013.01); *H02J 7/025* (2013.01); *H02J 17/00* (2013.01); *H02J 50/80* (2016.02); *A63B 2071/0694* (2013.01); *A63B 2220/833* (2013.01)

(58) Field of Classification Search
CPC ..................................................... H02J 7/025
See application file for complete search history.

(56) References Cited

U.S. PATENT DOCUMENTS

| | | |
|---|---|---|
| 415,884 A | 11/1889 | Shibe |
| 495,863 A | 4/1893 | Whitzel |

(Continued)

FOREIGN PATENT DOCUMENTS

| | | |
|---|---|---|
| CH | 403593 | 6/1966 |
| CN | 94242062.4 | 11/1995 |

(Continued)

OTHER PUBLICATIONS

European Search Report dated Aug. 14, 2015, directed to European Appl. No. 15168840.5-1804; 6 pages.

(Continued)

*Primary Examiner* — Robert Grant
*Assistant Examiner* — Tynese V McDaniel
(74) *Attorney, Agent, or Firm* — Sterne, Kessler, Goldstein & Fox P.L.L.C.

(57) ABSTRACT

Disclosed herein are system, method, and computer program product embodiments for inductively charging a sport ball. An embodiment operates by transmitting from a resonant circuit a calibration signal in response to detecting a charging base, and transmitting from the resonant circuit a charging state in response to receiving power at the resonant circuit. Another embodiment operates by transmitting from a resonant circuit a presence signal, receiving at the resonant circuit a calibration signal from a second resonant circuit in response to transmitting the presence signal, and transmitting from the resonant circuit power to the second resonant circuit in response to receiving the calibration signal.

14 Claims, 9 Drawing Sheets

(51) Int. Cl.
*H02J 50/80* (2016.01)
*A63B 47/00* (2006.01)
*A63B 71/06* (2006.01)

(56) References Cited

U.S. PATENT DOCUMENTS

| | | |
|---|---|---|
| 996,458 A | 6/1911 | Coleman |
| 1,187,029 A | 6/1916 | Beebout |
| 1,614,853 A | 11/1927 | Schwartz |
| 1,923,236 A | 8/1933 | Sonnett |
| 2,020,484 A | 11/1935 | Turner |
| 2,078,881 A | 4/1937 | Muenzinger |
| 2,221,534 A | 11/1940 | Voit et al. |
| 2,653,818 A | 9/1953 | Tebbetts, Jr. et al. |
| 2,874,964 A | 2/1959 | Edwards |
| 3,112,521 A | 12/1963 | Ward |
| 3,119,618 A | 1/1964 | Molitor et al. |
| 3,185,476 A | 5/1965 | Fechner |
| 3,229,976 A | 1/1966 | Allen, Jr. |
| 3,508,750 A | 4/1970 | Henderson |
| 3,580,575 A | 5/1971 | Speeth |
| 3,616,165 A | 10/1971 | Nishi |
| 4,065,150 A | 12/1977 | Van Auken |
| 4,154,789 A | 5/1979 | Delacoste |
| 4,187,134 A | 2/1980 | Svub et al. |
| 4,202,350 A | 5/1980 | Walton |
| 4,216,656 A | 8/1980 | Hamma |
| 4,285,846 A | 8/1981 | Hardy et al. |
| 4,312,358 A | 1/1982 | Barney |
| 4,318,544 A | 3/1982 | Brine |
| 4,333,648 A | 6/1982 | Aoyama |
| 4,399,992 A | 8/1983 | Molitor |
| 4,462,590 A | 7/1984 | Mitchell |
| 4,572,197 A | 2/1986 | Moore et al. |
| 4,577,865 A | 3/1986 | Shishido |
| 4,580,572 A | 4/1986 | Granek et al. |
| 4,595,200 A | 6/1986 | Shishido |
| 4,660,831 A | 4/1987 | Kralik |
| 4,798,386 A | 1/1989 | Berard |
| 4,802,671 A | 2/1989 | Gentiluomo |
| 4,826,177 A | 5/1989 | Ponte |
| 4,856,781 A | 8/1989 | Shishido et al. |
| 4,889,131 A | 12/1989 | Salem et al. |
| 4,909,260 A | 3/1990 | Salem et al. |
| 4,962,469 A | 10/1990 | Ono et al. |
| 4,998,734 A | 3/1991 | Meyer |
| 5,007,427 A | 4/1991 | Ramsey et al. |
| 5,040,795 A | 8/1991 | Sonntag |
| 5,091,265 A | 2/1992 | Kennedy et al. |
| 5,104,126 A | 4/1992 | Gentiluomo |
| 5,111,818 A | 5/1992 | Ramsey et al. |
| 5,123,659 A | 6/1992 | Williams |
| 5,148,002 A | 9/1992 | Kuo et al. |
| 5,153,584 A | 10/1992 | Engira |
| 5,181,717 A | 1/1993 | Donntag et al. |
| 5,204,670 A | 4/1993 | Stinton |
| 5,210,540 A | 5/1993 | Masumoto |
| 5,228,686 A | 7/1993 | Maleyko |
| 5,310,178 A | 5/1994 | Walker et al. |
| 5,320,345 A | 6/1994 | Lai et al. |
| 5,353,793 A | 10/1994 | Bornn |
| D352,317 S | 11/1994 | Bassignani |
| 5,400,254 A | 3/1995 | Fujita |
| 5,405,469 A | 4/1995 | Lin |
| 5,413,331 A | 5/1995 | Stillinger |
| D360,917 S | 8/1995 | Monso |
| 5,516,107 A | 5/1996 | Okumoto et al. |
| 5,583,776 A | 12/1996 | Levi et al. |
| 5,592,401 A | 1/1997 | Kramer |
| 5,611,085 A | 3/1997 | Rasmussen |
| 5,639,076 A | 6/1997 | Cmiel et al. |
| 5,649,701 A | 7/1997 | Mills et al. |
| 5,672,120 A | 9/1997 | Ramirez et al. |
| 5,688,192 A | 11/1997 | Aoyama |
| 5,688,198 A | 11/1997 | Teifert et al. |
| 5,711,725 A | 1/1998 | Bengtson |
| 5,724,025 A | 3/1998 | Tavori |
| 5,724,265 A | 3/1998 | Hutchings |
| 5,725,445 A | 3/1998 | Kennedy et al. |
| 5,741,195 A | 4/1998 | Sullivan et al. |
| 5,752,890 A | 5/1998 | Shishido et al. |
| 5,755,634 A | 5/1998 | Huang |
| 5,759,123 A | 6/1998 | Ou |
| 5,766,707 A | 6/1998 | Obermaier |
| 5,769,755 A | 6/1998 | Henry et al. |
| 5,772,545 A | 6/1998 | Ou |
| 5,779,575 A | 7/1998 | Hsieh |
| 5,802,492 A | 9/1998 | DeLorme et al. |
| 5,823,889 A | 10/1998 | Aoyama |
| 5,825,327 A | 10/1998 | Krasner |
| 5,865,697 A | 2/1999 | Molitor et al. |
| 5,883,569 A | 3/1999 | Kolefas |
| 5,888,156 A | 3/1999 | Cmiel et al. |
| 5,888,157 A | 3/1999 | Guenther et al. |
| 5,899,963 A | 5/1999 | Hutchings |
| 5,931,752 A | 8/1999 | Guenther et al. |
| 5,947,868 A | 9/1999 | Dugan |
| 5,948,040 A | 9/1999 | DeLorme et al. |
| 5,955,667 A | 9/1999 | Fyfe |
| 5,976,083 A | 11/1999 | Richardson et al. |
| 5,989,157 A | 11/1999 | Walton |
| 6,002,982 A | 12/1999 | Fry |
| D418,565 S | 1/2000 | Burgess |
| 6,013,007 A | 1/2000 | Root et al. |
| 6,032,108 A | 2/2000 | Seiple et al. |
| 6,047,203 A | 4/2000 | Sackner et al. |
| 6,066,093 A | 5/2000 | Kelly et al. |
| 6,073,086 A | 6/2000 | Marinelli |
| 6,097,345 A | 8/2000 | Walton |
| 6,099,423 A | 8/2000 | Ou |
| 6,122,340 A | 9/2000 | Darley et al. |
| 6,135,951 A | 10/2000 | Richardson et al. |
| 6,145,389 A | 11/2000 | Ebeling et al. |
| 6,148,262 A | 11/2000 | Fry |
| 6,148,271 A | 11/2000 | Marinelli |
| 6,151,563 A | 11/2000 | Marinelli |
| 6,157,898 A | 12/2000 | Marinelli |
| 6,198,394 B1 | 3/2001 | Jacobsen et al. |
| 6,204,807 B1 | 3/2001 | Odagiri et al. |
| 6,206,795 B1 | 3/2001 | Ou |
| 6,245,862 B1 | 6/2001 | Rajagopalan |
| 6,246,362 B1 | 6/2001 | Tsubata et al. |
| 6,251,035 B1 | 6/2001 | Fa |
| 6,254,551 B1 | 7/2001 | Varis |
| 6,266,623 B1 | 7/2001 | Vock et al. |
| 6,298,314 B1 | 10/2001 | Blackadar et al. |
| 6,301,964 B1 | 10/2001 | Fyfe et al. |
| 6,302,815 B1 | 10/2001 | Shishido et al. |
| 6,305,221 B1 | 10/2001 | Hutchings |
| 6,306,054 B1 | 10/2001 | Dobrounig |
| 6,336,365 B1 | 1/2002 | Blackadar et al. |
| 6,356,856 B1 | 3/2002 | Damen et al. |
| 6,357,147 B1 | 3/2002 | Darley et al. |
| 6,381,482 B1 | 4/2002 | Jayaraman et al. |
| 6,398,616 B1 | 6/2002 | Motosko, III |
| 6,443,890 B1 | 9/2002 | Schulze |
| 6,458,229 B2 | 10/2002 | Dobrounig |
| 6,463,385 B1 | 10/2002 | Fry |
| 6,478,736 B1 | 11/2002 | Mault |
| 6,493,652 B1 | 12/2002 | Ohlenbusch et al. |
| 6,503,162 B1 | 1/2003 | Shishido et al. |
| 6,513,381 B2 | 2/2003 | Fyfe et al. |
| 6,513,532 B2 | 2/2003 | Mault et al. |
| 6,536,139 B2 | 3/2003 | Darley et al. |
| 6,537,125 B1 | 3/2003 | Motosko, III |
| 6,551,252 B2 | 4/2003 | Sackner et al. |
| 6,582,330 B1 | 6/2003 | Rehkemper et al. |
| 6,585,622 B1 | 7/2003 | Shum et al. |
| 6,590,536 B1 | 7/2003 | Walton |
| 6,611,789 B1 | 8/2003 | Darley |
| 6,616,613 B1 | 9/2003 | Goodman |
| 6,626,799 B2 | 9/2003 | Watterson et al. |
| D482,418 S | 11/2003 | Estefano |
| 6,685,585 B2 | 2/2004 | Shishido et al. |

(56) References Cited

U.S. PATENT DOCUMENTS

| | | | |
|---|---|---|---|
| 6,716,139 B1 | 4/2004 | Hosseinzadeh-Dolkhani et al. |
| 6,736,759 B1 | 5/2004 | Stubbs et al. |
| 6,745,069 B2 | 6/2004 | Nissila et al. |
| 6,790,178 B1 | 9/2004 | Mault et al. |
| 6,798,378 B1 | 9/2004 | Walters |
| 6,832,109 B2 | 12/2004 | Nissila |
| 6,876,947 B1 | 4/2005 | Darley et al. |
| 6,882,955 B1 | 4/2005 | Ohlenbusch et al. |
| 6,885,971 B2 | 4/2005 | Vock et al. |
| 6,898,550 B1 | 5/2005 | Blackadar et al. |
| 6,959,259 B2 | 10/2005 | Vock et al. |
| 6,970,731 B1 | 11/2005 | Jayaraman et al. |
| 7,062,225 B2 | 6/2006 | White |
| 7,072,789 B2 | 7/2006 | Vock et al. |
| 7,092,846 B2 | 8/2006 | Vock et al. |
| 7,171,331 B2 | 1/2007 | Vock et al. |
| 7,179,181 B2 | 2/2007 | Fo |
| 7,187,924 B2 | 3/2007 | Ohlenbusch et al. |
| 7,200,517 B2 | 4/2007 | Darley et al. |
| 7,216,053 B2 | 5/2007 | Rakkola et al. |
| 7,220,220 B2 | 5/2007 | Stubbs et al. |
| 7,251,454 B2 | 7/2007 | Wnite |
| 7,254,516 B2 | 8/2007 | Case, Jr. et al. |
| 7,273,431 B2 | 9/2007 | DeVall |
| 7,292,867 B2 | 11/2007 | Werner et al. |
| 7,428,472 B2 | 9/2008 | Darley et al. |
| 7,457,724 B2 | 11/2008 | Vock et al. |
| 7,467,060 B2 | 12/2008 | Kulach et al. |
| 7,480,512 B2 | 1/2009 | Graham et al. |
| 7,552,031 B2 | 6/2009 | Vock et al. |
| 7,559,902 B2 | 7/2009 | Ting et al. |
| 7,647,196 B2 | 1/2010 | Kahn et al. |
| 7,650,257 B2 | 1/2010 | Alexander et al. |
| 7,654,922 B2 | 2/2010 | Vassiliev |
| 7,670,263 B2 | 3/2010 | Ellis et al. |
| 7,670,295 B2 | 3/2010 | Sackner et al. |
| 7,680,523 B2 | 3/2010 | Rytky |
| 7,689,378 B2 | 3/2010 | Kolen |
| 7,698,830 B2 | 4/2010 | Townsend et al. |
| 7,706,815 B2 | 4/2010 | Graham et al. |
| 7,715,982 B2 | 5/2010 | Grenfell et al. |
| 7,740,551 B2 * | 6/2010 | Nurnberg ............... A63B 41/02 473/570 |
| 7,805,149 B2 | 9/2010 | Werner et al. |
| 7,805,150 B2 | 9/2010 | Graham et al. |
| 7,844,415 B1 | 11/2010 | Bryant et al. |
| 7,890,291 B2 | 2/2011 | Godin et al. |
| 7,891,666 B2 | 2/2011 | Kuenzler et al. |
| 7,980,998 B2 | 7/2011 | Shemesh et al. |
| 8,060,337 B2 | 11/2011 | Kulach et al. |
| 8,253,586 B1 | 8/2012 | Matak |
| 8,517,869 B2 * | 8/2013 | Steidle ................... A63B 41/02 473/570 |
| 8,540,560 B2 | 9/2013 | Crowley et al. |
| 8,579,632 B2 | 11/2013 | Crowley |
| 8,702,430 B2 | 4/2014 | Dibenedetto et al. |
| 2002/0032386 A1 | 3/2002 | Sackner et al. |
| 2002/0068873 A1 | 6/2002 | Nissila |
| 2002/0107433 A1 | 8/2002 | Mault |
| 2002/0160883 A1 | 10/2002 | Dugan |
| 2003/0045383 A1 | 3/2003 | Jiminez |
| 2003/0073526 A1 | 4/2003 | Morrison et al. |
| 2003/0144095 A1 | 7/2003 | Yan |
| 2003/0163287 A1 | 8/2003 | Vock et al. |
| 2003/0208409 A1 | 11/2003 | Mault |
| 2003/0224337 A1 | 12/2003 | Shum et al. |
| 2003/0224885 A1 | 12/2003 | Leal et al. |
| 2004/0012524 A1 | 1/2004 | Couronne et al. |
| 2004/0020420 A1 | 2/2004 | Evans et al. |
| 2004/0046692 A1 | 3/2004 | Robson et al. |
| 2004/0102931 A1 | 5/2004 | Ellis et al. |
| 2004/0145342 A1 * | 7/2004 | Lyon ...................... H02J 7/025 320/108 |
| 2004/0162170 A1 | 8/2004 | Ng |
| 2004/0171956 A1 | 9/2004 | Babashan |
| 2004/0177531 A1 | 9/2004 | DiBenedetto et al. |
| 2004/0199056 A1 | 10/2004 | Husemann et al. |
| 2004/0209600 A1 | 10/2004 | Werner et al. |
| 2005/0010096 A1 | 1/2005 | Blackadar |
| 2005/0049092 A1 | 3/2005 | Lo |
| 2005/0054941 A1 | 3/2005 | Ting et al. |
| 2005/0101411 A1 | 5/2005 | Stiller et al. |
| 2005/0170920 A1 | 8/2005 | Boyer et al. |
| 2005/0195094 A1 | 9/2005 | White |
| 2005/0197063 A1 | 9/2005 | White |
| 2005/0227811 A1 | 10/2005 | Shum et al. |
| 2005/0233815 A1 | 10/2005 | McCreary et al. |
| 2005/0250458 A1 | 11/2005 | Graham et al. |
| 2005/0266961 A1 | 12/2005 | Shum et al. |
| 2006/0020421 A1 | 1/2006 | Darley et al. |
| 2006/0025282 A1 | 2/2006 | Redmann |
| 2006/0135297 A1 | 6/2006 | Cruciani |
| 2006/0136173 A1 | 6/2006 | Case, Jr. et al. |
| 2006/0148594 A1 | 7/2006 | Saintoyant et al. |
| 2006/0189360 A1 | 8/2006 | White |
| 2006/0240865 A1 | 10/2006 | White |
| 2006/0246869 A1 | 11/2006 | Ohlenbusch et al. |
| 2007/0006489 A1 | 1/2007 | Case, Jr. et al. |
| 2007/0011919 A1 | 1/2007 | Case, Jr. |
| 2007/0021244 A1 | 1/2007 | Fo |
| 2007/0021269 A1 | 1/2007 | Shum |
| 2007/0032318 A1 | 2/2007 | Nishimura et al. |
| 2007/0037641 A1 | 2/2007 | Wong |
| 2007/0059675 A1 | 3/2007 | Kuenzler et al. |
| 2007/0060425 A1 | 3/2007 | Kuenzler et al. |
| 2007/0061105 A1 | 3/2007 | Darley et al. |
| 2007/0191083 A1 | 8/2007 | Kuenzler et al. |
| 2007/0203665 A1 | 8/2007 | Darley et al. |
| 2007/0208531 A1 | 9/2007 | Darley et al. |
| 2007/0247306 A1 | 10/2007 | Case |
| 2007/0281811 A1 | 12/2007 | Wang |
| 2007/0287596 A1 | 12/2007 | Case et al. |
| 2008/0009275 A1 | 1/2008 | Werner et al. |
| 2008/0051993 A1 | 2/2008 | Graham et al. |
| 2008/0058971 A1 | 3/2008 | Graham et al. |
| 2008/0059064 A1 | 3/2008 | Werner et al. |
| 2008/0065319 A1 | 3/2008 | Graham et al. |
| 2008/0088303 A1 | 4/2008 | Englert |
| 2008/0103689 A1 | 5/2008 | Graham et al. |
| 2008/0125288 A1 | 5/2008 | Case |
| 2008/0201100 A1 | 8/2008 | Petrov |
| 2008/0274844 A1 | 11/2008 | Ward |
| 2008/0319661 A1 | 12/2008 | Werner et al. |
| 2009/0047645 A1 * | 2/2009 | Dibenedetto ...... H04M 1/72563 434/258 |
| 2009/0048044 A1 | 2/2009 | Oleson et al. |
| 2009/0048070 A1 | 2/2009 | Vincent et al. |
| 2009/0096413 A1 * | 4/2009 | Partovi ................... H01F 5/003 320/108 |
| 2009/0233770 A1 | 9/2009 | Vincent et al. |
| 2009/0292178 A1 | 11/2009 | Ellis et al. |
| 2010/0042427 A1 | 2/2010 | Graham et al. |
| 2010/0069181 A1 | 3/2010 | Lin |
| 2010/0088023 A1 | 4/2010 | Werner |
| 2010/0090532 A1 * | 4/2010 | Shelton ..................... H02J 3/32 307/46 |
| 2010/0121599 A1 | 5/2010 | Boeve et al. |
| 2010/0130314 A1 | 5/2010 | von der Gruen et al. |
| 2010/0184564 A1 | 7/2010 | Molyneux et al. |
| 2010/0201352 A1 | 8/2010 | Englert |
| 2010/0292050 A1 | 11/2010 | DiBenedetto et al. |
| 2010/0292599 A1 | 11/2010 | Oleson et al. |
| 2010/0292600 A1 | 11/2010 | Dibenedetto et al. |
| 2011/0054270 A1 | 3/2011 | Derchak |
| 2011/0054271 A1 | 3/2011 | Derchak et al. |
| 2011/0054272 A1 | 3/2011 | Derchak |
| 2011/0054290 A1 | 3/2011 | Derchak |
| 2011/0074345 A1 * | 3/2011 | Erario ................... H02J 7/0027 320/108 |
| 2011/0082641 A1 | 4/2011 | Werner et al. |
| 2011/0087115 A1 | 4/2011 | Sackner et al. |
| 2011/0105861 A1 | 5/2011 | Derchak et al. |
| 2011/0119022 A1 | 5/2011 | Kuenzler et al. |
| 2011/0130643 A1 | 6/2011 | Derchak et al. |

(56) References Cited

U.S. PATENT DOCUMENTS

| | | | |
|---|---|---|---|
| 2011/0140538 A1* | 6/2011 | Jung | H02J 7/0027 307/104 |
| 2011/0235636 A1 | 9/2011 | Hsiu et al. | |
| 2012/0083705 A1 | 4/2012 | Yuen et al. | |
| 2012/0235636 A1* | 9/2012 | Partovi | H02J 7/025 320/108 |
| 2012/0246795 A1 | 10/2012 | Scheffler et al. | |
| 2012/0253484 A1 | 10/2012 | Burich et al. | |
| 2012/0254934 A1 | 10/2012 | McBrearty et al. | |
| 2012/0326660 A1* | 12/2012 | Lu | H02J 17/00 320/108 |
| 2013/0020876 A1* | 1/2013 | Kim | H02J 5/005 307/104 |
| 2013/0026849 A1* | 1/2013 | Ohta | G06F 1/12 307/104 |
| 2013/0026983 A1* | 1/2013 | Yamamoto | H02J 7/0055 320/108 |
| 2013/0041590 A1 | 2/2013 | Burich et al. | |
| 2013/0049484 A1* | 2/2013 | Weissentern | H02J 5/005 307/104 |
| 2013/0181539 A1* | 7/2013 | Muratov | H01F 38/14 307/104 |
| 2013/0274040 A1 | 10/2013 | Coza et al. | |
| 2013/0274635 A1 | 10/2013 | Coza et al. | |
| 2013/0274904 A1 | 10/2013 | Coza et al. | |
| 2013/0285605 A1* | 10/2013 | Partovi | H02J 7/0042 320/108 |
| 2014/0191568 A1* | 7/2014 | Partovi | H02J 7/025 307/9.1 |
| 2014/0197783 A1* | 7/2014 | Kim | H02J 7/025 320/108 |
| 2014/0200103 A1* | 7/2014 | Thurman | G09B 19/0038 473/570 |
| 2014/0309058 A1 | 10/2014 | San Juan | |
| 2015/0137746 A1* | 5/2015 | Lee | H02J 5/005 320/108 |
| 2015/0176784 A1* | 6/2015 | Hu | F21S 4/006 315/76 |
| 2016/0020831 A1* | 1/2016 | Hamada | H02J 7/042 320/108 |

FOREIGN PATENT DOCUMENTS

| | | |
|---|---|---|
| CN | 101095055 A | 12/2007 |
| CN | 101224337 A | 7/2008 |
| CN | 101367012 A | 2/2009 |
| CN | 101589313 A | 11/2009 |
| CN | 101701823 A | 5/2010 |
| CN | 101828320 A | 9/2010 |
| CN | 102223609 A | 10/2011 |
| DE | 829109 | 7/1949 |
| DE | 1172585 | 6/1964 |
| DE | 2125758 | 12/1972 |
| DE | 2273625 | 5/1982 |
| DE | 3918038 | 1/1991 |
| DE | 44 34 889 | 4/1995 |
| DE | 42 33 341 | 3/1997 |
| DE | 200 04 174 | 8/2001 |
| DE | 100 29 456 | 9/2001 |
| DE | 100 29 459 | 9/2001 |
| DE | 100 29 463 | 9/2001 |
| DE | 100 29 464 | 9/2001 |
| DE | 103 50 300 A1 | 6/2005 |
| DE | 10361826 A1 | 7/2005 |
| DE | 10 2007 013 025 | 7/2008 |
| DM | 055893 | 4/2001 |
| EP | 0 385 872 | 3/1990 |
| EP | 0 894 514 A2 | 2/1999 |
| EP | 1 080 745 A1 | 7/2001 |
| EP | 1134555 A1 | 9/2001 |
| EP | 1 637 192 A1 | 3/2006 |
| EP | 2016425 B1 | 6/2011 |
| EP | 2650807 A1 | 10/2013 |
| EP | 2657924 A1 | 10/2013 |
| FR | 1488920 | 6/1967 |
| FR | 2 215 249 | 8/1974 |
| FR | 2 443 850 | 7/1980 |
| FR | 2 572 674 | 5/1986 |
| FR | 2 667 510 | 4/1992 |
| FR | 2752117 A1 | 2/1998 |
| FR | 2797776 A1 | 3/2001 |
| FR | 2 806 922 A1 | 10/2001 |
| GB | 2429411 A | 2/2007 |
| JP | 38-16729 | 8/1963 |
| JP | 54-65638 | 5/1979 |
| JP | 27-3908 | 12/1983 |
| JP | 58-215335 | 12/1983 |
| JP | 215335/1983 | 12/1983 |
| JP | 1-265979 | 10/1989 |
| JP | 07-96014 | 10/1995 |
| JP | 8-252341 | 10/1996 |
| JP | 9-019516 | 1/1997 |
| JP | 10-323409 | 12/1998 |
| WO | WO 93/06894 | 4/1993 |
| WO | WO 95/09034 | 4/1995 |
| WO | WO 97/17109 | 5/1997 |
| WO | WO 97/20449 | 6/1997 |
| WO | WO 99/59684 | 11/1999 |
| WO | WO 99/61114 | 12/1999 |
| WO | WO 01/66201 | 9/2001 |
| WO | WO 2002/067449 A2 | 8/2002 |
| WO | WO 2005/044396 A2 | 5/2005 |
| WO | WO 2012/014110 | 2/2012 |
| WO | WO 2013172630 A1 * 11/2013 ............. H02J 5/005 |
| WO | WO 2014/008202 A1 | 1/2014 |

OTHER PUBLICATIONS

European Search Report dated Jul. 30, 2015, directed to European Appl. No. 15165886.1-1958; 7 pages.

Asai, T. et al., "The curve kick of a football I: impact with the foot," Sports Engineering, vol. 5, No. 4, Nov. 1, 2002, pp. 183-192.

Alcock, A., et al., "Initial Ball Flight Characteristics of Curve and Instep Kicks in Elite Women's Football," Journal of Applied Biomechanics, vol. 28, Feb. 1, 2012, pp. 70-77.

Office Action issued in Chinese Application No. 201310129427.7, dated Dec. 29, 2014; 6 pages.

Office Action issued in Chinese Application No. 201310128838.4, dated Feb. 2, 2015; 9 pages.

Office Action issued in Chinese Application No. 201310128838.4, dated Aug. 5, 2015; 10 pages.

Concise explanation of Office Action issued in Chinese Application No. 201310129427.7, dated Dec. 29, 2014; 3 pages.

Concise explanation of Office Action issued in Chinese Application No. 201310128838.4, dated Feb. 2, 2015; 4 pages.

English translation of Office Action issued in Chinese Application No. 201310128838.4, dated Aug. 5, 2015; 13 pages.

Shead, S., "Shirt Capable of Converting Body Heat into Electricity," The Engineer, http://www.theengineer.co.uk/electronics/news/shirt-capable-of-converting-body-heat-into-electricity/1010775.article, dated Nov. 3, 2011, accessed Mar. 16, 2013.

Yun, X., et al., "A Simplified Quaternion-Based Algorithm for Orientation Estimation From Earth Gravity and Magnetic Field Measurements," IEEE Transactions on Instrumentation and Measurement, vol. 57, No. 3, pp. 638-650, Mar. 2008.

U.S. Appl. No. 14/120,272, inventors Coza, A., et al., filed May 14, 2014.

First Chinese Office Action (with English translation) directed to related Chinese Patent Application No. CN105098937 (A), dated Feb. 27, 2017; 26 pages.

English-Language Abstract for Chinese Patent Publication No. 101828320 (A), published Sep. 8, 2010; 2 pages.

* cited by examiner

SPORT BALL INDUCTIVE CHARGING METHODS AND SYSTEMS

FIELD OF THE INVENTION

Embodiments of the present invention generally relate to methods and systems for inductively charging a piece of athletic equipment. More particularly, embodiments of the present invention relate to methods and systems for inductively charging a sport ball for use by an individual during an athletic activity.

BACKGROUND OF THE INVENTION

Athletic activity is important to maintaining a healthy lifestyle and is a source of entertainment for many people. Some individuals prefer to engage in team athletic activities such as, for example, soccer or basketball, while other individuals prefer to engage in individual athletic activities such as, for example, running or skiing. Regardless of whether the activity is a team or individual activity, it is common for individuals to participate in both competitive sessions, such as a soccer match or a running race, and more informal training sessions such as conducting soccer drills or running interval sprints.

Technology has resulted in the development of athletic monitoring devices that are capable of recording information about an individual's performance during an athletic activity using sensors, and in some cases providing feedback about the individual's performance. Some portable athletic monitoring devices employ sensors attached to a piece of athletic equipment. Such sensors may be capable of measuring various parameters associated with the individual's physical activity, such as motion parameters.

Athletic monitoring devices require power. And when an athletic monitoring device is to be used for extended periods of time, such as in an athletic event, it may be desirable for the device to be capable of storing sufficient power and being conveniently recharged. However, adding reliable power sources to athletic equipment, such as sport balls, is difficult. Removable power sources can interfere with the form or function of athletic equipment. Other systems, such as standard inductive charging systems, do not adapt well to athletic equipment. For example, curves in athletic equipment surfaces can make it difficult to align the components of inductive charging systems, which generally rely on magnets to ensure proper alignment. In addition, athletic equipment material, construction, weight, and size requirements can further complicate the design of a properly configured inductive charging system.

BRIEF SUMMARY OF THE INVENTION

What is needed are new methods and systems for inductively charging a piece of athletic equipment, e.g. one having improved capabilities. At least some of the embodiments of the present invention may satisfy one or more of the above needs and provide further related advantages as will be made apparent by the description that follows.

Embodiments of the present invention relate to a method for inductively charging a sport ball that includes transmitting from a resonant circuit a calibration signal in response to detecting a sport ball charging base, and transmitting from the resonant circuit a charging state in response to receiving power at the resonant circuit.

Embodiments of the present invention also relate to a method for inductively charging a sport ball that includes transmitting from a resonant circuit a presence signal, receiving at the resonant circuit a calibration signal from the sport ball in response to transmitting the presence signal, and transmitting from the resonant circuit power to the sport ball in response to receiving the calibration signal.

Embodiments of the present invention further relate to a system including a memory and at least one processor couple to the memory and configured to transmit from a resonant circuit a calibration signal in response to detecting a charging base, and transmit from the resonant circuit a charging state in response to receiving power at the resonant circuit Embodiments of the present invention also relate to a system including a memory and at least one processor couple to the memory and configured to transmit from a resonant circuit a presence signal, receive at the resonant circuit a calibration signal from a second resonant circuit in response to transmitting the presence signal, and transmit from the resonant circuit power to the second resonant circuit in response to receiving the calibration signal.

Embodiments of the present invention farther relate to a non-transitory computer-readable device having instructions stored thereon that, when executed by at least one computing device, causes the at least one computing device to perform operations including transmitting from a resonant circuit a calibration signal in response to detecting a charging base, and transmitting from the resonant circuit a charging state in response to receiving power at the resonant circuit.

Embodiments of the present invention also relate to a non-transitory computer-readable device having instructions stored thereon that, when executed by at least one computing device, causes the at least one computing device to perform operations including transmitting from a resonant circuit a presence signal, receiving at the resonant circuit a calibration signal from a second resonant circuit in response to transmitting the presence signal, and transmitting from the resonant circuit power to the second resonant circuit in response to receiving the calibration signal.

Additional features of embodiments of the invention will be set forth in the description that follows, and in part will be apparent from the description, or may be learned by practice of the invention. Both the foregoing general description and the following detailed description are exemplary and explanatory and are intended to provide further explanation of the invention as claimed.

BRIEF DESCRIPTION OF THE DRAWINGS/FIGURES

The accompanying figures, which are incorporated herein, form part of the specification and illustrate embodiments of the present invention. Together with the description, the figures further serve to explain the principles of and to enable a person skilled in the relevant arts to make and use the invention.

DETAILED DESCRIPTION OF THE INVENTION

Figure 1:
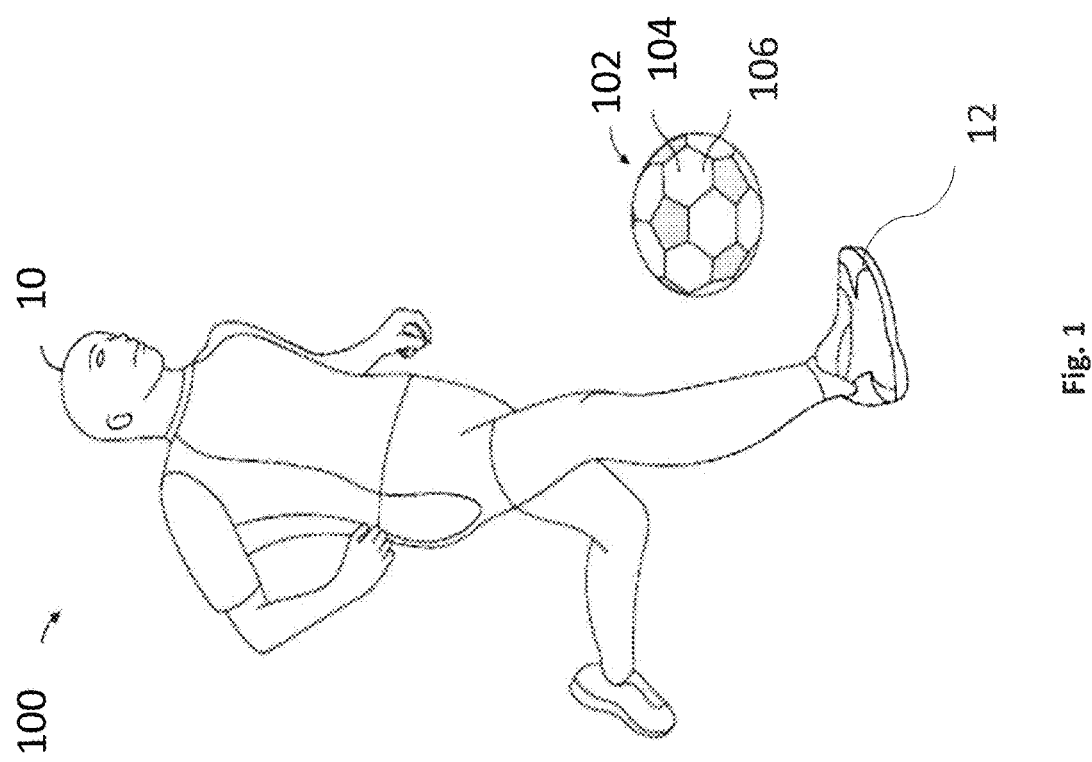
FIG. 1 is an illustration of an individual using an inductively-charged sport ball according to an example embodiment.

The present invention will now be described in detail with reference to embodiments thereof as illustrated in the accompanying drawings. References to "one embodiment", "an embodiment", "an example embodiment", "some embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "invention" or "present invention" as used herein is a non-limiting term and is not intended to refer to any single embodiment of the particular invention but encompasses all possible embodiments as described in the application.

Various aspects of the present invention, or any parts or functions thereof, may be implemented using hardware, software, firmware, non-transitory tangible computer readable or computer usable storage media having instructions stored thereon, or a combination thereof, and may be implemented in one or more computer systems or other processing systems.

The present invention generally relates to methods and systems for inductive charging a piece of athletic equipment. More particularly, embodiments of the present invention relate to methods and systems for inductively charging a sport ball for use by an individual during an athletic activity. Embodiments of the present invention may also relate to methods and systems for monitoring the motion of a piece of athletic equipment, such as a sport ball, during an athletic activity. An individual engaged in an athletic activity (or another interested person such as a coach, teammate, or spectator) may desire to obtain information about the motion of a piece of the individual's athletic equipment during the course of the athletic activity. Some embodiments of the present invention further relate to a sport ball motion monitoring system portable electronic device software application. Exemplary methods and systems for monitoring the motion of a sport ball used by an individual during an athletic activity are disclosed in commonly owned U.S. patent application Ser. No. 14/120,272, filed May 14, 2014, the entirety of which is incorporated herein by reference thereto.

For example, if the individual is participating in an activity that involves the use of a sport ball, such as playing in a soccer (i.e., football) match, it may be desirable, for example, to be able to determine the various launch angles at which the soccer ball (i.e., football) was kicked by the individual, to be able to determine the rate of rotation of the soccer ball after it was kicked by the individual, to be able to determine the peak speeds that the soccer ball was traveling at after being kicked by the individual, or to be able to determine the specific locations on the surface of the ball where the individual's foot struck the ball when kicking the ball.

In an embodiment, the movement of a plurality of pieces of athletic equipment used by a plurality of individuals engaged in an athletic activity (e.g., teammates or opponents in a team sport) may be monitored. In some embodiments, real-time monitoring and/or feedback may be provided, while in other embodiments post-activity feedback may be provided. In some embodiments, feedback may be provided by an athletic equipment motion monitoring system portable electronic device software application.

By using an athletic activity monitoring system including one or more portable sensors, embodiments of the present invention described below may advantageously enable an individual (or their coach, teammate, or a spectator) to obtain this or other information about the motion of a piece of the individual's athletic equipment during the course of the athletic activity. Data obtained by sensors may be processed in a variety of ways to yield useful information about the motion of an object of interest during the activity. In some embodiments, sensor data may be processed to monitor changes in the spatial orientation (i.e., changes in the position and/or rotation, relative to a specific location on the Earth or other point of reference) of a piece of the individual's athletic equipment. In other embodiment, sensor data may be processed to by reference to a predetermined correlation between movement data and an activity metric stored in a data structure.

In one embodiment, information about the motion of a piece of the individual's athletic equipment may be used, for example, to provide coaching to the individual about how their movements could be improved, or as a check on the accuracy of a referee, umpire, or other athletic competition judge's judgment related to the movement of the athletic equipment.

FIG. 1 is an illustration of an individual 10 using a motion monitoring system 100 according to an embodiment of the present invention. The individual 10 may desire to obtain information about the motion of a piece of the individual's 10 athletic equipment 104 during the course of the athletic activity using motion monitoring systems 100 according to the present invention.

Motion monitoring systems 100 according to embodiments of the present invention may be suitable for use by individuals 10 for team or individual athletic activities and for competitive and informal training sessions. For example, motion monitoring systems 100 according to embodiments of the present invention may be suitable for use by individuals 10 engaged in athletic activities such as baseball, basketball, bowling, boxing, cricket, cycling, football (i.e., American football), golf, hockey, lacrosse, rowing, rugby, running, skateboarding, skiing, soccer (i.e., football), surfing, swimming, table tennis, tennis, or volleyball, or during training sessions related thereto.

Motion monitoring systems 100 according to embodiments of the present invention may include a sensor module. The sensor module may include one or more sensors, and may be physically coupled to a piece of athletic equipment 104 during an athletic activity conducted by an individual 10. The sensor module may be used to monitor changes in the spatial orientation of a piece of athletic equipment 104 in some embodiments, while the sensor module may be used in combination with predetermined correlation data stored in a data structure to determine a correlation between equipment movement data and an activity metric in other embodiments.

In one embodiment, the sensor module may include a processor, a power source 102, a memory, a transceiver, and an acceleration sensor operatively connected to one another to carry out the functionality of the sensor module. The processor may be adapted to implement application programs stored in the memory of the sensor module. In other embodiments, one or more of these sensor module components may be omitted, or one or more additional components may be added. Exemplary sensor modules for use with sport balls 106 are disclosed in commonly owned U.S. patent application Ser. No. 13/446,982, filed Apr. 13, 2012 (which published as U.S. Patent App. Pub. No. 2013/0274040), the entirety of which is incorporated herein by reference thereto.

Motion monitoring systems 100 according to embodiments of the present invention may include a power supply 102, either as a part of the sensor module or as a separate component. The power supply 102 may include one or more power supplies, and may be physically coupled to a piece of athletic equipment 104 during an athletic activity conducted by an individual 10. As explained in further detail below, the power supply 102 may be used to power one or more devices in athletic equipment 104 in some embodiments.

In some embodiments, as illustrated in FIG. 1, the power supply 102 may be physically coupled to the piece of athletic equipment 104. In the illustrated embodiment, the power supply 102 is physically coupled to a piece of athletic equipment 104 that is a soccer ball 106 that the individual 10 is kicking with their foot 12. In other embodiments, the power supply 102 may be configured to be physically coupled to other pieces of athletic equipment 104 such as, for example, any type of sport ball 106, any type of sport "stick" (e.g., a baseball bat, hockey stick, golf club, table tennis paddle, or tennis racquet), a sport glove, a bicycle, an oar, a shoe, a boot, a ski, a hat or cap, a skateboard, a surfboard, or a pair of glasses or goggles. In some embodiments, multiple power supplies 102 can be coupled to the same piece of athletic equipment 104, or multiple separate pieces of hardware may perform the function of a single power supply 102 to achieve the functions specified herein.

A sport ball 106 may include an outer layer enclosing a hollow void of the sport ball 106. The outer layer may be stitched, bonded, and/or glued together from panels of leather or plastic and laced to allow access to an internal air bladder, if necessary. In other embodiments, the sport ball 106 may be a non-hollow sport ball 106 (e.g., a baseball, bowling ball, or golf ball) including a single, solid layer or multiple different layers.

The power supply 102—by itself or coupled to a sensor module—may be physically coupled to the piece of athletic equipment 104 by a variety of coupling means depending on the nature of the piece of athletic equipment 104 and the athletic activity. For example, the power supply 102 may be physically coupled to a sport ball 106 by being attached to the exterior of the sport ball 106, by being attached to an interior surface of a hollow sport ball 106, by being suspended by a suspension system in the interior of a hollow sport ball 106, or by being integrated into the outer layer or other layer of a multi-layer sport ball 106.

Figure 2:
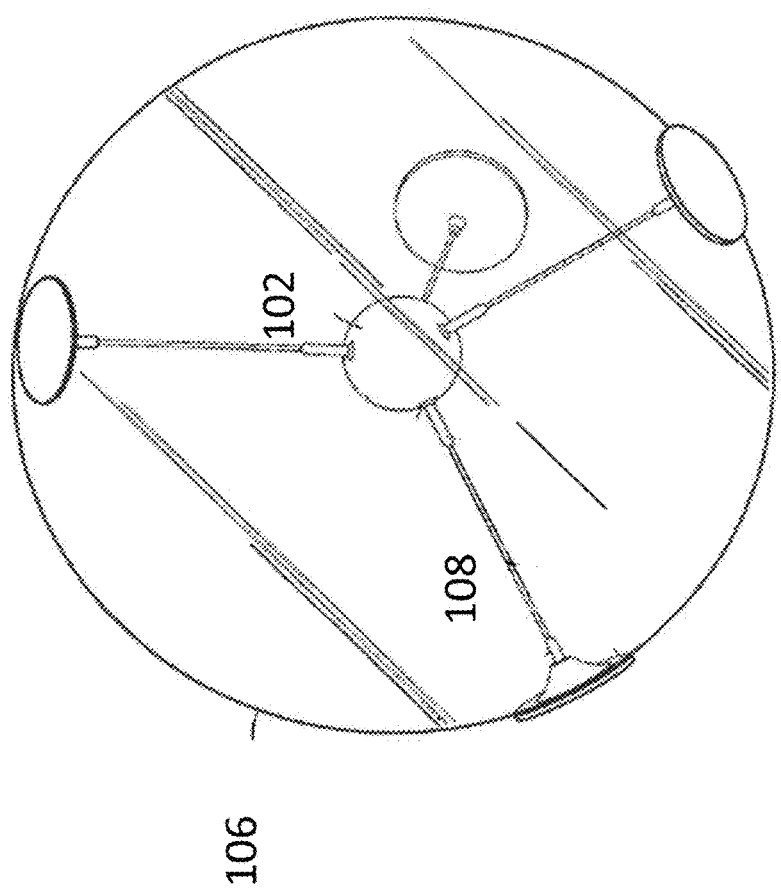
FIG. 2 is an illustration of a sport ball according to an example embodiment.

For example, FIG. 2 illustrates a sensor module including a power supply 102 suspended by several cables 108 in the interior of a hollow soccer ball 106. This arrangement allows for the power supply to be which is shock-mounted and protected at the center of the sport ball 106. Also, the power supply 102 may be physically coupled to a non-hollow sport ball 106 (e.g., a baseball, bowling ball, or golf ball) by, for example, being attached to the exterior of the sport ball 106, being integrated between layers of a multi-layer sport ball 106, by being embedded in a solid portion of the sport ball 106. Exemplary techniques that can be employed to mount a sensor module including a power supply 102 to sport ball 106 are disclosed in commonly owned U.S. Pat. No. 7,740,551, filed Nov. 18, 2009, and commonly owned U.S. Pat. No. 8,517,869, also filed Nov. 18, 2009, the entireties of which are incorporated herein by reference thereto.

In some embodiments, the power supply 102 may be attached to or incorporated into a sport ball 106 prior to sale to an individual 10, while in other embodiments the individual 10 may later insert the power supply 102 after purchasing the sport ball 106.

As further examples, the power supply 102—by itself or coupled to a sensor module—may be releasably or non-releasably physically coupled to a sport "stick" by being wrapped around a portion of the sport stick, by being clipped to a portion of the sport stick, by being attached to an exterior surface of the sport stick, by being attached to an interior surface of a hollow or non-hollow sport stick, by being suspended by a suspension system in the interior of a hollow sport stick, or by being integrated into the wall or other layer of a multi-layer or composite sport stick. The power supply 102 may be physically coupled to the piece of athletic equipment 104 by a variety of coupling means such as, for example, straps, adhesives, or by being integrated into the piece of athletic equipment 104. In one embodiment, the power supply 102 may be releasably or non-releasably physically coupled to a piece of athletic equipment 104, such as a sport stick, be being incorporated into a sleeve that is secured about the outside of a piece of athletic equipment 104, such as a sport stick or a handle thereof.

Figure 3:
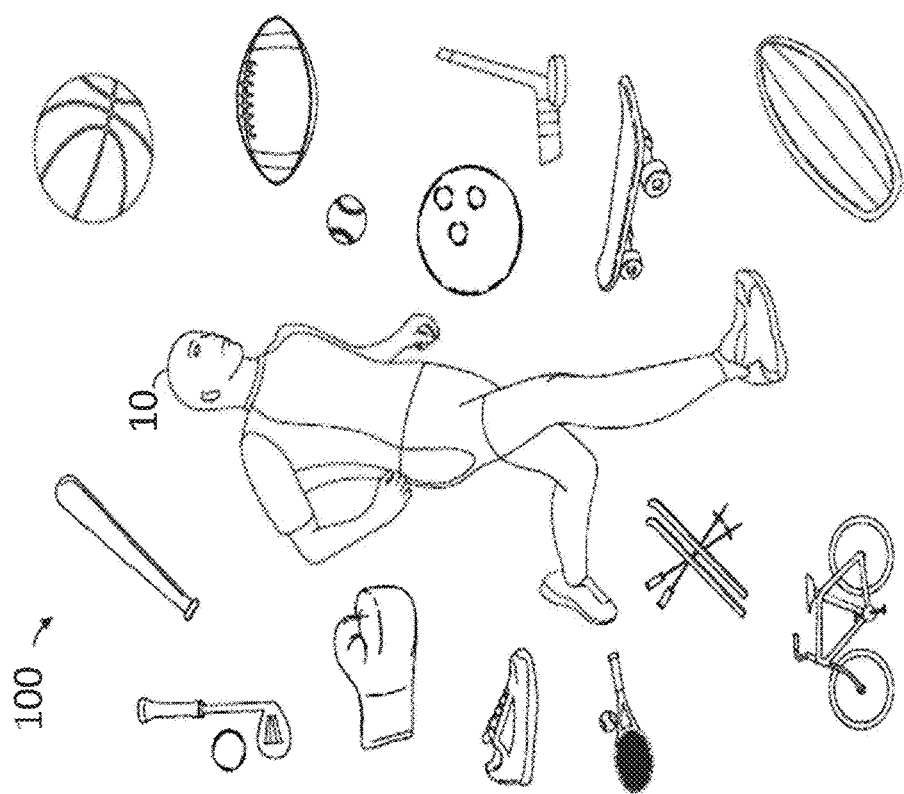
FIG. 3 is an illustration of various different pieces of athletic equipment according to example embodiments.

FIG. 3 is an illustration of various different pieces of athletic equipment 104, including but not limited to sport balls 106 and sport sticks, that could be used according to embodiments of the monitoring system 100 of the present invention. As illustrated, the inductive charging system of the present invention may be used with a variety of different pieces of athletic equipment 104, such as, for example, a basketball, a football, a baseball bat, a baseball, a bowling ball, a hockey stick, a hockey puck, a skateboard, a surfboard, a bicycle, a pair of skis, ski poles, a tennis racquet, a tennis ball, an article of footwear, a boxing glove, a golf club, or a golf ball.

In some embodiments of the present invention, the piece of athletic equipment 104 could be wearable by the individual 10 such as an article of clothing, an article of footwear, or athletic protective equipment. In these embodiments, the power supply 102 may be physically coupled to the portion of the individual's 10 body by a variety of releasable or non-releasable coupling means such as, for example, straps, adhesives, pockets, clips, or by being integrated into an article of clothing (e.g., shirt, pants, sock, glove, or hat), footwear, or athletic protective equipment worn by the individual 10.

In other embodiments, the power supply 102 may be integrated within an existing piece of athletic performance monitoring equipment such as, for example, a heart rate monitoring device, a pedometer, and accelerometer-based monitoring device, or other portable fitness monitoring device.

Figure 4:
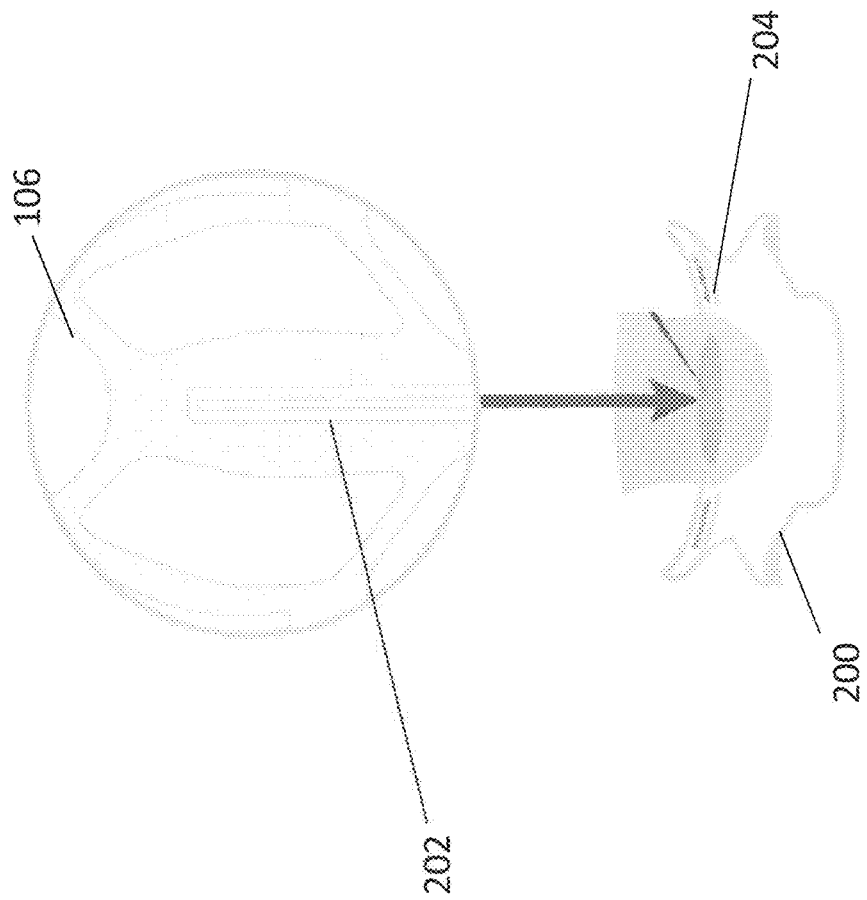
FIG. 4 is an illustration of a sport ball and a charging base, according to an example embodiment.

For example, as illustrated in FIG. 4, power supply 102 of a piece of athletic equipment 104 in accordance with embodiments of the present invention, such as a soccer ball 106, can be powered by charging via a charging base 200.

For example, power supply 102 of soccer ball 106 may be powered by inductive charging, in which case an inductive coil may be mounted in soccer ball 106 and coupled to power supply 102. In some embodiments the inductive coil may receive power from an inductive charging device, such as charging base 200, when soccer ball 106 is placed so that the inductive coil is sufficiently close to an inductive coil charging device.

In some embodiments, soccer ball 106 has exterior markings 202 to indicate the location of the inductive coil or to otherwise facilitate optimum orientation of soccer ball 106 for charging. For example, in the embodiment of FIG. 4, the vertical line exterior marking 202 on the front of the soccer ball 106 could be aligned with a corresponding line (not illustrated) of the charging base 200 when the soccer ball 106 is properly positioned for charging. In another embodiment, exterior markings 202 in the form of a charging icon, such as a lightning bolt icon or a series of concentric circles, could be present on a bottom surface of the soccer ball 106, and matching or complementary exterior markings 202 could be present on the charging base 200 so that the individual 10 could know that these exterior markings 202 should be aligned for optimal charging. An alignment for optimal charging may be, for example, an orientation having the inductive coil of the soccer ball 106 closest to the inductive coil charging device of the charging base 200.

In some embodiments, as illustrated in FIG. 4, the charging base 200 may include one or more visual indicators 204, such as, for example, one or more externally-visible light emitting diodes ("LEDs") that give an indication of the strength of charge being received through the inductive coil, to facilitate optimum orientation of the soccer ball 106. For example, the LEDs may emit or not emit light, the light emitted by the LEDs may change color, or the speed of the LEDs blinking may change to indicate the strength of charge being received. In other embodiments, similar LEDs with similar functionality may part of the soccer ball 106 instead of or in addition to part of the charging base 200.

In some embodiments, charging base 200 provides power to charge one or more battery cells (e.g. a Lithium cell) of the power supply 102 inside the sport ball 106. The one or more battery cells, as well as accompanying electronics, can be mounted at the center of the sport ball 106, possibly along with a sensor module. The one or more battery cells, as well as accompanying electronics, can be connected to a power receiver coil on the inside surface of the ball 106 by a cable, e.g. a thin, flexible cable. When the ball 106 is properly aligned over the transmitter coil in the base 200 of the charger, energy can be transferred into the sport ball 106, for use by the cell charger circuitry. The sport ball 106 can communicate with the charger 200 by modulating the inductive coupling of the receiver coil.

In some embodiments, the inductive charging system formed by the sport ball 106 and charging base 200 exhibit particular characteristics. First, the transformer action can fall into the class of operation known as loosely coupled, with effective coupling coefficients between 0.1 and 0.4. The coefficient in this type of coupling (e.g. "air core" coupling) is much less than the 0.98 or greater coefficient of transformers wound on high permeability cores. Second, both of the resonant circuits in the sport ball 106 and charging base 200 can be run with resonant capacitors, which can be used to produce the strong magnetic field for the power transfer from a low voltage power supply.

In an embodiment, a capacitor for a very low equivalent series resistance (ESR) (e.g. at 100 kHz) can be selected. For example, if a 5 V drive signal is applied to the charging base's 200 resonant circuit, that circuit can easily drive the sport ball's 106 coil voltage to 100V P-P, causing significant heating in both the coil and in the series resonant capacitor. The coil can reach 60° C. at these levels. A ceramic cap (X7R), may reach more than 80° C., changing its capacitance value and resonant frequency (C vs. temperature coefficient). Selecting the capacitor for very low ESR (at 100 kHz) minimizes the heating. For example, NP0 capacitors and some plastic capacitors can show very little heating and excellent temperature stability. At these resonant drive levels, the drive transistors can also get quite hot.

If the transmitting and receiving coils are both set for the same resonant frequencies, a maximum voltage transfer can be achieved. Unfortunately, as the secondary load changes the reflected load is non-obvious, depending upon a variety of conditions. Even ignoring that fact that the coupling coefficient can go negative as the physical center of the pickup coil crosses the center of the width of the primary coil winding, there are other ratios that can go to zero, or change sign. This effect can occur as the system resonant peak changes from the operating frequency as the load changes. To avoid this sign-change, operating at frequencies near, but above the resonant frequencies of the coils and tuning capacitors (e.g. 95 kHz to 110 kHz) may be used.

Figure 5:
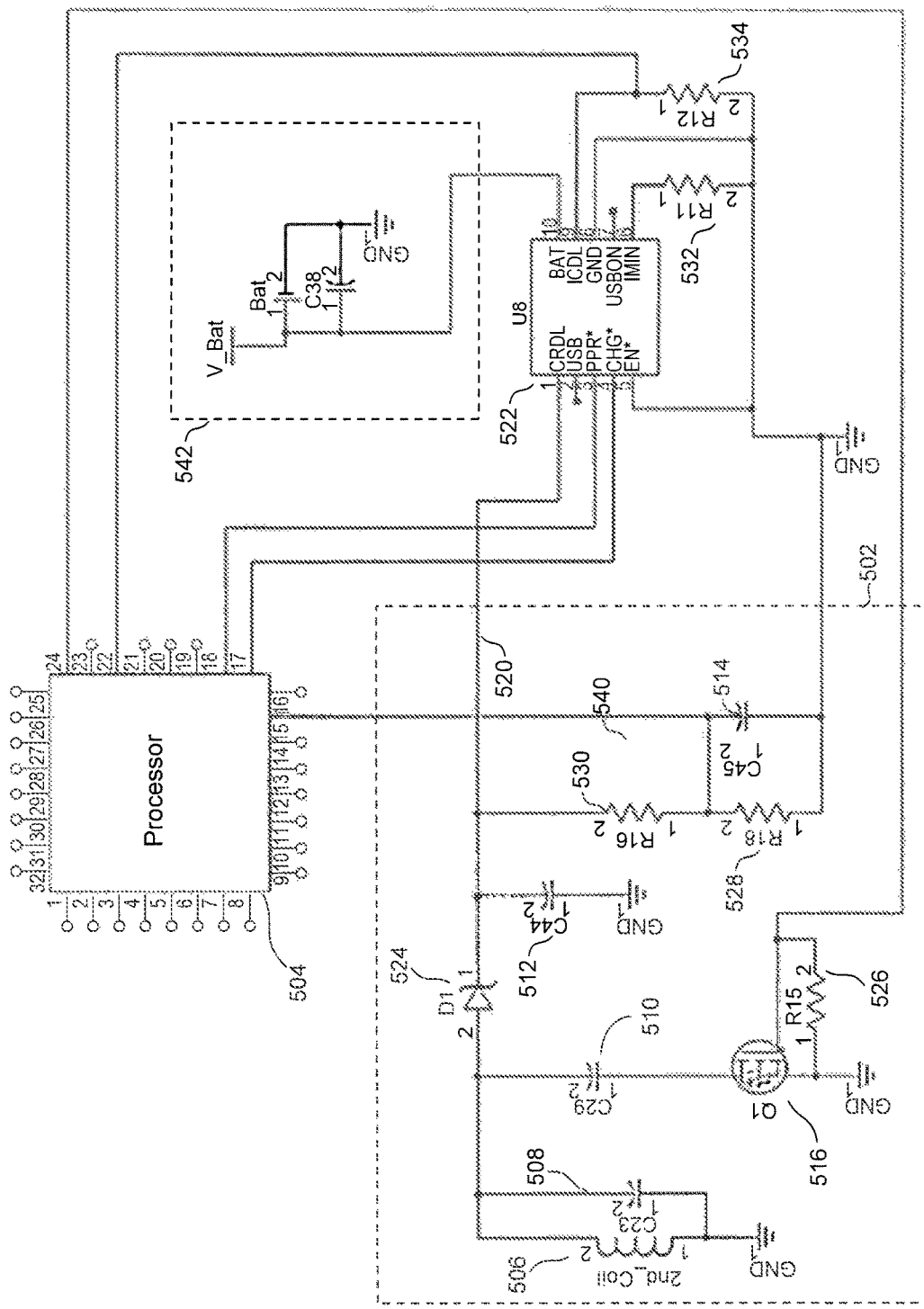
FIG. 5 is a block diagram of components of a sport ball, according to an example embodiment.

FIG. 5 is a block diagram of components of a sport ball 106 that includes resonant circuit 502, processor 504, cell charger 522, resistors 532 and 534, and battery 542. In one embodiment, battery 542 serves as the power source 102 of the sport ball 106. In an embodiment, processor 504 is configured to perform functions of an analog to digital converter (ADC). In an embodiment, the sport ball 106 also includes an oscillator, e.g. a crystal oscillator (not shown). Although the sport ball 106 is depicted by FIG. 5 as having a particular configuration, embodiments of the invention support alternate configurations of a sport ball, e.g. configurations having varying numbers of resistors, capacitors, diodes, LEDs, power supplies, buses, inductor coils, detection points, oscillators, ADCs, batteries, etc. Further, although the sport ball 106 is discussed as the device being charged by charging base 200, embodiments of the invention support any device incorporating the inductive charging system depicted as a part of the sport ball 106, including but not limited to a different piece of athletic equipment 104.

Resonant circuit 502 includes inductor coil 506, capacitors 508, 510, 512, and 514, data Field-effect Transistor (FET) 516, bus 520, diode 524, resisters 526, 528, and 530, and bus 540. In an embodiment, processor 504 reads the input voltage from the coil at a receiver voltage sense, e.g. bus 540. This voltage is turned into the PWM (frequency encoded) signal that can be sent back to the charger. Although resonant circuit 502 is depicted as having the particular components discussed above, embodiments of the invention support other configurations. For example, in one configuration, resonant circuit 502 can include only inductor coil 506, capacitor 508, and capacitor 510.

In an embodiment, an ADC (e.g. processor 504), measures the input voltage and reports the voltage by sending out a signal to the gate of the data FET 516. As an example, the voltage may be limited to a range of 4V to 8V. When data FET 516 is turned on, more capacitance is added in parallel with inductor coil 506 of the tank circuit at capacitor 510. Adding more capacitance in parallel with inductor coil 506 changes the resonant frequency of resonant circuit 502 and changes the voltage on the tank circuit.

In an embodiment and depending on resonant circuit 502 conditions, such as operating frequency, component tolerance, load current, etc., the tank voltage may be higher or lower while sending the data bits. However, because there is a transient at the leading and trailing edges of these data pulses, the processor 504 can detect the bits on bus 540 with good reliability.

In an embodiment, inductor coil 506 transmits a signal carrying data bits. For example, data bits transmitted from inductor coil 506 can communicate a charging state of the cell charger 522, such as normal charging or trickle charging, the input voltage received at the input of the cell charger 522 on bus 520, or any combination thereof. As another example, inductor coil 506 can transmit a calibration signal that the charging base 200 can use to synchronize the charging base 200 processor's oscillator (e.g. an R-C oscillator) within a given reliability (e.g. up to 1% error) with the sport ball's 106 oscillator.

In an embodiment, charging state information, e.g. charging or trickle, is only used to control the initial aiming threshold.

In an embodiment, a data pulse control. PWM output on bus 520 is the signal that creates the data bits. Bus 520 can be driven low for 200 µS to create a data pulse, in which the frequency of the pulses is proportional to the input voltage on a receiver voltage sense line, e.g. 540.

In an embodiment, the voltage communication transmitted by the sport ball 106 can allow the charging base 200 to adjust the transmitted power, e.g. to the minimum level necessary for proper charging action. The charging state of the cell charger 522 can be encoded in the frequency bands selected for the voltage reporting. For example, a trickle state can be encoded as a frequency between 100 and 160 Hz, and the charge state can be encoded as a frequency between 200 and 320 Hz. These two frequency ranges can include not only the charging state, but can also specify and translate into a voltage range, e.g. 4V-8V. The frequencies and voltages may correspond to one another via any relationship, e.g. a linear transformation.

In an embodiment, calibration signal transmitted by resonant circuit 502 is based on the sport ball's 106 oscillator. For example, the calibration signal can be transmitted for 100 mS of each second at a frequency of 400 Hz. The calibration signal can be selected to be out of the range of the voltage reporting signals, e.g., at a higher frequency, so that missing the voltage reporting pulses is not erroneously interpreted as calibration data.

Additional features of the components depicted in FIG. 5 are discussed below in conjunction with FIG. 6, but, the features of FIG. 5 are not limited by FIG. 6.

Figure 6:
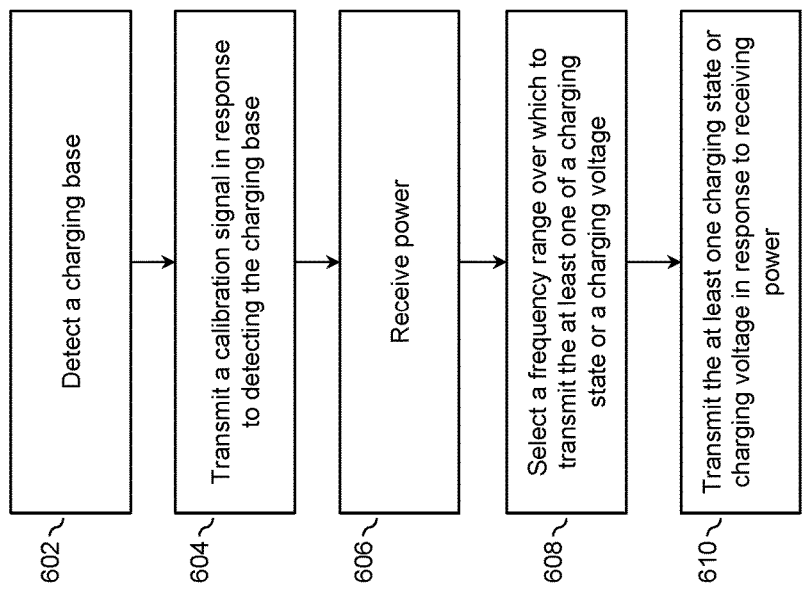
FIG. 6 is a flowchart illustrating a process for inductively charging a sport ball, according to an example embodiment.

FIG. 6 is a flowchart illustrating a process 600 for inductively charging a sport ball 106, according to an example embodiment. Process 600 can be performed by processing logic that can comprise hardware (e.g., circuitry, dedicated logic, programmable logic, microcode, etc.), software (e.g., instructions run on a processing device), or a combination thereof. For example, process 600 may be performed by processor 504 or any other computing system. In one embodiment, process 600 may be performed by a processor of a sensor module of the sport ball 106 coupled to or in communication with the power supply 102 of the sport ball 106.

In an embodiment, one or more of blocks 602-610 are repeated in a loop. During the loop the status of calibration, temperature, and the level of the Inductor-Capacitor (L-C) tank voltage are evaluated in each pass of the loop. For example, the loop can be implemented to evaluate the system state every 100 mS, selecting a system state, and performing an action corresponding to the selected system state. System states can include, but are not limited to, an initialize state, a ping state, an aim state, a charge state, a trickle state, and an over-temperature state.

In block 602, a charging base 200 may be detected. In an embodiment, processor 504 detects charging base 200. Charging base 200 may be detected based on receiving at resonant circuit 502 a presence signal transmitted by the charging base 200. In an embodiment, the presence signal is a pulse having a resonant frequency range of the resonant circuit 502, e.g., but not limited to, between 90 kHz and 115 kHz.

In block 604, a calibration signal is transmitted. In an embodiment, processor 504 transmits the calibration signal from resonant circuit 502 in response to detecting charging base 200, e.g. by receiving the presence signal. For example, resonant circuit 702 can cause a load modulation at or in a calibration signal frequency range, e.g. at 400 Hz, in response to receiving power from charging base 200.

In block 606, power may be received. In an embodiment, resonant circuit 502 receives power from charging base 200 at resonant circuit 502.

In block 608, a frequency range is selected over which to transmit at least one of a charging state or a charging voltage In an embodiment, processor 504 selects the frequency range over which to transmit at least one of the charging state or a charging voltage. Processor 504 can determine the charging state or charging voltage based or inputs it receives from resonant circuit 502. As discussed above, a charging state and/or a charging voltage can correspond to one or more frequencies.

In block 610, at least one of a charging state or charging voltage is transmitted in response to receiving power. In an embodiment, processor 504 transmits at least one of a charging state or charging voltage from resonant circuit 502 in response to receiving power from charging base 200 at resonant circuit 502. For example, the processor 504 can set the return frequency that corresponds to the charging state and/or charging voltage of cell charger 522.

Figure 7:
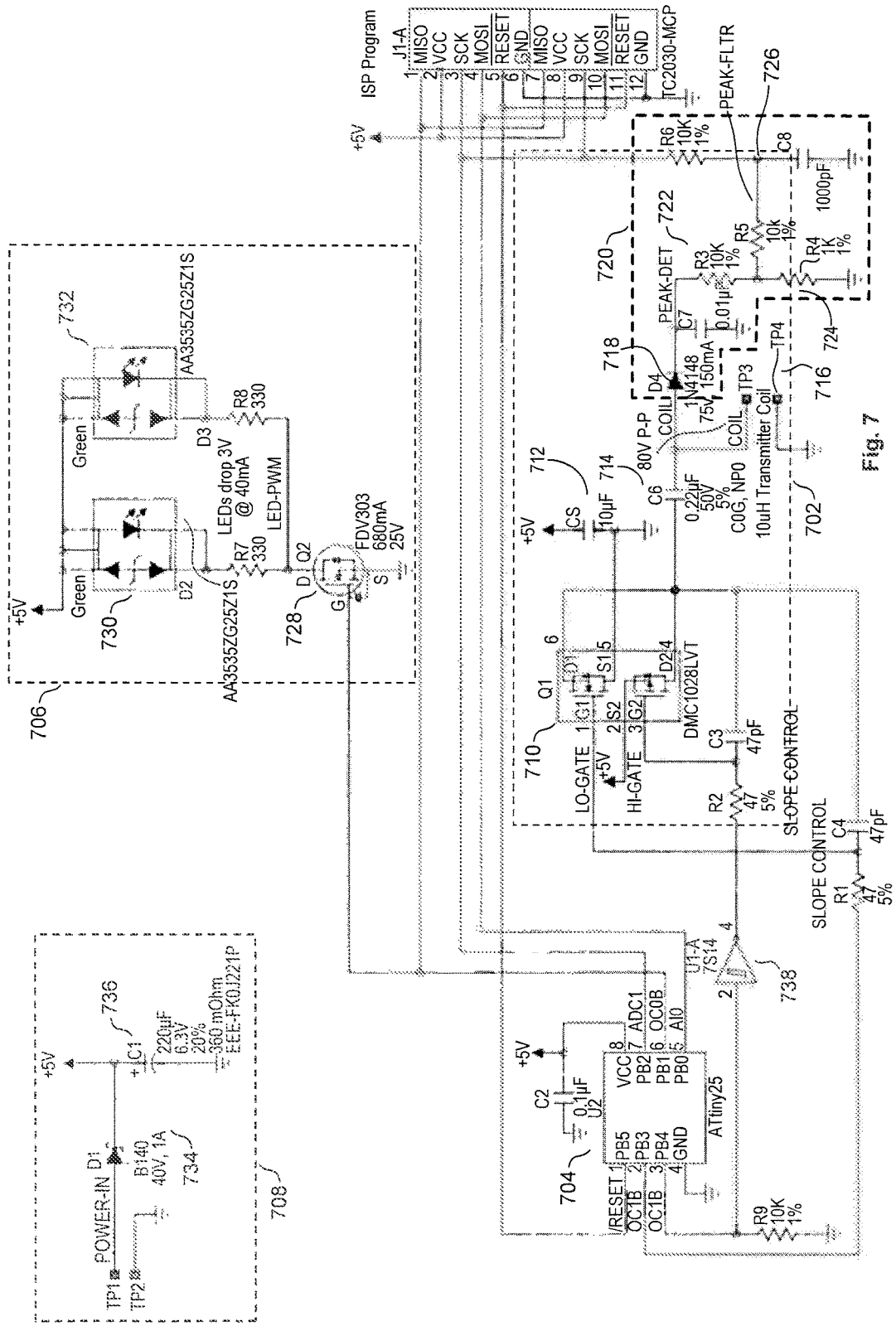
FIG. 7 is a block diagram of components of a charging base, according to an example embodiment.

FIG. 7 is a block diagram of components of a charging base 200 that includes resonant circuit 702, processor 704, LED drive 706, and input power circuit 708. Although charging base 200 is depicted by FIG. 7 as having a particular configuration, embodiments of the invention support alternate configurations of charging base 200, e.g. configurations having varying numbers of resistors, capacitors, diodes, LEDs, power supplies, buses, inductor coils, detection points, oscillators, ADCs, etc.

Resonant circuit 702 includes half bridge 710, FET bypass capacitor 712, tank capacitor 714, inductor coil 716, tank detector diode 718, peak detection circuit 720, voltage divider resistors 722 and 724, and peak filter point 726. Half bridge 710 can include any dual FET half bridge, e.g. those having a low on resistance (e.g. 0.3 Ohm sum f P and N channels), a VDS>15 V, and more than 500 mW. FET bypass capacitor 712 can comprise a ceramic X7R, for example. Tank detector diode 718 can comprise a diode with a 75 V min. Inductor coil 716 may operate at 100 kHz ESR. Tank capacitor 714 can comprise an NPO, 5% at least 50V. Although resonant circuit 702 is depicted as having the particular components discussed above, embodiments of the invention support other configurations. For example, in one configuration, resonant circuit 702 can include only capacitor 714 and inductor coil 716.

In an embodiment, a pair of complementary FETs, configured as a half-bridge 710, drives the tank capacitor 714 of the resonant circuit 702. The drive signals are non-overlapping, controlled by internal registers in the processor 704, e.g. those of an ATtiny25. In an embodiment, if there are firmware constraints in processor 704's complementary drive, an extra inversion can be provided, as depicted by gate drive inverter 738, e.g., provided by the 7S14 package or any Schmitt inverter. The switching speed of the FETs has been reduced by using the series input gate resistors, along with the drain-gate Miller Effect capacitors. The slow-down of the switching trades off a few degrees rise in the FETs for reduction of a 55 MHz RFI emissions spike.

In an embodiment, the voltage at the high side of the grounded coil 716 is peak detected, and then filtered and divided to provide the processor 704's analog to digital (A/D) input with a signal used for two purposes. The first purpose is to monitor the resonant circuit 702 voltage, adjusting the half-bridge drive's duty cycle to provide a P-P signal that is just strong enough for the power transfer requirements, avoiding wasted energy. The second purpose is to detect the resonant modulations from the resonant circuit 502, as the resonant circuit 502 reports the level of the received power and the calibration signal(s), which may be crystal oscillator controlled. The A/D input monitors the peak detector circuit 720, and uses the average level of the peak detected voltage to monitor the drive level, while short term variations indicate the resonant circuit 502's data bits.

In an embodiment, processor 704 is an Atmel Tiny25 microcontroller. The Tiny25, as well as similar microcontrollers, are well suited based on the minimum size and cost control for the charging base 200.

In an embodiment, processor 704 is configured to perform functions of an analog to digital converter (ADC). In an embodiment, the charging base 200 also includes an oscillator, e.g. a crystal oscillator (not shown).

In an embodiment, processor 704 performs one or more A/D conversions. The A/D conversions can be continuous, e.g. running at approximately 20 kHz (50 uS), and can be used to time various high-speed events with counters that are incremented at each interrupt. For example, an 8-bit A/D input can come from a voltage divider that detects the positive peaks of the transmitter coil resonant voltage. The voltage can be averaged with a pseudo finite impulse response (FIR) filter, e.g. a FIR 32 measurement filter. Before a measurement is added to the sum, one average measurement is subtracted from the current sum. The new result (sum of 32 measurements) is calculated as: new_sum=old_sum−old_sum/32+new_A/D.

In an embodiment, the average is used for two functions. The first is to set the desired level of the L-C tank voltage for power level control, giving enough voltage to the transmitter coil, but not so much that excessive power is dissipated while looking for a ball to charge. This can form a feedback loop, in which processor 704 monitors the voltage on the coil and adjusts the frequency accordingly, thereby accounting for any manufacturing variability. The second function is to detect the feedback signal from a ball 106, detecting the data being sent back by the ball's 106 tuning modulation pulses. For example, depending on the coupling, loading, and component tolerances, the detected pulses are usually positive excursions from the average, but can sometimes be negative excursions. Because there is some ringing on these pulses, they can be detected as short term deviations from the average by watching for the differences between short term maximums and minimums. Once this difference is detected a short "dead time" is begun to detect only the first edge of the short data pulse, avoiding false triggers on the trailing edge.

In an embodiment, the data pulses from the resonant circuit 502 are sent out in three different pulse frequency ranges: one for calibration, and two for communicating the resonant circuit 502's received voltage and the charging mode. For example, the calibration signal can be a 100 mS duration, 400 Hz burst from a crystal controlled resonant circuit 502. This allows the transmitter to adjust the processor 702's oscillator control register for errors in a smaller range, e.g. in the 1% range, as opposed to the 10% worst case specification. The resonant circuit 502 input voltage is transmitted, e.g. encoded as 100 Hz to 160 Hz to indicate 4V to 8V in trickle charge mode, and 200 Hz to 320 Hz to indicate the same voltage range in normal charge mode. The frequency ranges can chosen based on a multiplicity of reasons, such as tank circuit time constants, processor timer limitations, human interface response times, etc., and embodiments support other frequency ranges. In an embodiment, there are 100 mS gaps between the calibration signal and voltage data output modes, thereby allowing for easier discrimination between the two data modes.

In an embodiment, the data pulse decoding is based on detecting the leading edges of the data pulses, and then measuring the time for four data pulses. This technique allows enough pulses for our calibration, and is fast enough to not impact performance. The reported four-pulse time can be the accumulation of A/D interrupts, e.g. 50 uS each, for each four-pulse interval.

In an embodiment, a timer is set for approximately 200 Hz (5 ms) interrupts, incrementing various counters and performing the decoding and filtering operations on the received resonant circuit 702 data pulses (4-pulse interval counts), along with control of the LED brightness modes. The resonant circuit 702 frequency detection is evaluated for information transmitted from the resonant circuit 702. Some filtering can be performed to avoid erroneous interpretation of the boundaries and gaps between the three modes of the incoming data. If calibration data is detected, the calibration values are updated. If resonant circuit 502's voltage data is detected, the mode (charge or trickle) is updated, along with the reported resonant circuit 502's input voltage.

In an embodiment, the LEDs 730 and 732 are driven from processor 702, through FET 728 (e.g. an N-FET), with a resistor in series with each LED. Processor 702 can control the apparent brightness by the duty cycle of the PWM drive to the FET 728. As an example, the normal LED modes can defined as a 2 Hz blink for Aim mode, and a 2.3-second "sine-wave" brightness cycle for charge mode. FET 728 can be any FET that has a gate threshold voltage of less than 2 V.

In an embodiment, the input power passes through a Schottky diode 734 (e.g. 1 A average) to protect against reverse voltage power supplies. The power is filtered with the input capacitor 736, which is large enough to keep the processor 704's power supply voltage within normal operating conditions while supplying the current surges required by the half-bridge 710's FETs. For example, input capacitor 736 may be 220 uF min, 6.3V min, 360 mOhm ESR max.

Additional features of the components depicted in FIG. 7 are discussed below in conjunction with FIG. 8, but, the features of FIG. 7 are not limited by FIG. 8.

Figure 8:
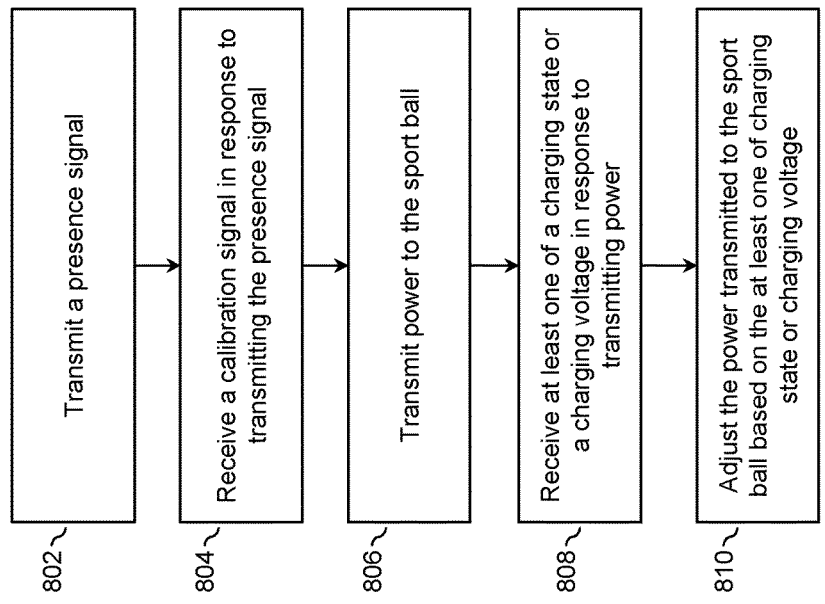
FIG. 8 is a flowchart illustrating a process for inductively charging a sport ball, according to an example embodiment.

FIG. 8 is a flowchart illustrating a process 800 for inductively charging a sport ball 106, according to an example embodiment. Process 800 can be performed by processing logic that can comprise hardware (e.g., circuitry, dedicated logic, programmable logic, microcode, etc.), software (e.g., instructions run on a processing device), or a combination thereof. For example, process 800 may be performed by processor 704 or any other computing system. In one embodiment, process 800 may be performed by a processor of the charging base 200.

In an embodiment, one or more of blocks 802-810 are repeated in a loop. During the loop the status of calibration, temperature, and the level of the L-C tank voltage are evaluated in each pass of the loop. For example, the loop can be implemented to evaluation the system state every 100 mS, selecting a system states, and performing an action corresponding to the selected system state. System states can include, but are not limited to, an initialize state, a ping state, an aim state, a charge state, a trickle state, and an over-temperature state.

In block 802, a presence signal is transmitted. In an embodiment, processor 704 transmits the presence signal from resonant circuit 702. Presence signal can be transmitted during an initialization state.

In an embodiment, charging base 200 performs one of two options, depending on the presence or absence of a ball's resonant circuit 502. In the absence of a ball's resonant circuit 502, the power transmission circuitry of resonant circuit 702 drives the inductor coil 716 frequency, e.g. by starting at the highest frequency (e.g. about 115 kHz), and then reducing the frequency, thereby raising the resonant drive voltage for a presence signal strong enough to sense the presence of a ball without wasting too much power, e.g. approximately 35V P-P at a 50% duty cycle. This coil drive servo-to-peak-voltage method compensates for tolerance of the resonant components, along with the possibly uncalibrated system oscillator frequency. In the presence of a ball's resonant circuit 502, such as when a ball is in resting on and aligned with charging base 200, the induction coil 716 can be loaded beyond the ability to achieve the "open circuit" resonant voltage level of the unloaded condition. Processor 704 recognizes the extra load on resonant circuit 702, and then proceeds to the lowest allowed frequency in the configuration, e.g. 90 kHz to 100 kHz, for a maximum power transfer as it enters the ping state.

In an embodiment, once the resonant coil voltage level is set, the system sends out a pulse, e.g. a 100 mS pulse of the coil drive frequency each second, while monitoring the peak amplitude of the resonant circuit 702. This low duty cycle keeps power dissipation at levels below the predetermined "wasted power" levels of the "Green" standards.

In an embodiment, as the ball approaches charging base 200, energy from the charging base 200's resonant circuit 502 is received by the ball's resonant circuit 702. The ball can power up with received energy and response with a presence data burst. The ball data bits can be short pulses to a FET that temporarily adds extra capacitance to the ball's resonant circuit 502, changing the free-resonant frequency of the ball's resonant circuit 502. Changes to the ball's resonant circuit 502 can change the loading on the charger base 200's transmitted power, resulting in increasing or decreasing the load, which can change the voltage amplitude of the charger base 200's resonant circuit 702.

In an embodiment, the presence data can also be used as calibration data. Charger base 200 may or may not have a crystal oscillator.

In block 804, a calibration signal is received in response to transmitting the presence signal. In an embodiment, resonant circuit 702 receives the calibration signal. For example, processor 704 can detect a load modulation at or in a calibration signal frequency range, e.g. at 400 Hz. In an embodiment, the charger oscillator calibration adjustment is performed to achieve better measurement accuracy. After the calibration signal is received, the system enters the aim state.

In an embodiment, when the charging base 200 receives the calibration data burst, it performs some sanity checking before any adjustments are applied to processor 704's oscillator adjustment registers. By using the calibration signal, the software can mostly ignore the initial timing errors, thereby reducing the safety bands for the various component related functions.

In block 806, power is transmitted to the sport ball 106. In an embodiment, power is transmitted from resonant circuit 702 to the sport ball 106. Power can be transmitted during the aim state, charge state, and trickle state.

In an embodiment, the aim state begins with continuous power to the coil drive at maximum duty cycle, e.g. 50% duty cycle. LEDs 730 and 732 can be set to the "Aim Blink" LED pattern, e.g. 2 Hz rate, and processor 704 waits for one of two conditions.

In block 808, at least one of a charging state or a charging voltage is received in response to transmitting power. In an embodiment, processor 704 determines the charging state, charging voltage, or both charging state and charging voltage of the sport ball 106 from a return frequency of the ball's resonant circuit 502.

In an embodiment, the system enters the charging state or trickle charging state based on the return frequency. If the return frequency indicates a "normal charging" rate, e.g. results above 5.5V at the cell charge 522 input for several measurement cycles, the charge state is entered. If the return frequency indicates a "trickle charging" rate, the threshold for state change is set to a higher level, e.g. 7.5 V, to assure a good mechanical alignment at this lighter load as charge state is entered.

In an embodiment, charging base 200 exhibits one or more behaviors during the charge state. For example, LEDs 730 and 732 can cycle through a brightness pattern to indicate that the ball is being charged, e.g. a "sine wave" of approximately 0.5 Hz brightness pattern. The coil drive duty cycle can be continually adjusted, as desired, to provide the minimum input signal to adequately power the cell charger 522. LEDs 730 and 732 can continue to cycle through the brightness pattern until processor 704 signals the trickle mode and the system will progress to Trickle state.

In an embodiment, charging base 200 exhibits one or more behaviors during the trickle state. For example, if cell charger 522 is being charged at a trickle rate, LEDs 730 and 732 can cycle through a brightness pattern to indicate that the ball is being charged for a time period, e.g. an additional 20 seconds of operation after entering the trickle state, which lets the user know that all is well with the ball placement before LEDs 730 and 732 turn off. Additionally or alternatively, LEDs 730 and 732 can turn off, but the coil drive duty cycle can continue to adjust to the minimum required power transfer to power the ball.

In block 810, power transmitted to the sport ball 106 is adjusted based on the at least one of the charging state or charging voltage. In an embodiment, processor 704 adjusts the power sent by resonant circuit 702 to the sport ball 106. For example, if the charging state or charging voltage change, (e.g. transitioning from the trickle state to charge state or vice versa), the power transmitted to the sport ball 106 can be adjusted accordingly to conform with the behavior of the state.

In an embodiment, if a the charger base's 200 temperature sensor detects a temperature beyond a particular threshold or range, e.g. a temperature greater than 65 degree C. (+/−10 degrees), the charger base 200 can enter a thermal shutdown mode, during which LEDs 730 and 732 can display a brightness pattern, e.g. blinking at a 0.5 Hz rate with a very short (e.g. 20 mS) on-time. Charger base 200 can remain in this mode for a period of time, e.g. about five minutes, after the sensed temperature has dropped below the temperature trip point.

In an embodiment, while in charge or trickle states, changes in the ball position may reduce the inductive coupling beyond the capabilities of the control system. If the power transfer can't automatically adjust to maintain full charging capability, the charger base 200 can reset to initial conditions to try again. If full charging power cannot be achieved, charger base 200 can remain in aim state, e.g. blinking the lights and inviting user intervention. If the ball position is changed beyond the point of reliable communication, the charger base 200 can reset and enter the ping state.

The above described systems and methods may provide sufficient power charging and storing features enable a sport ball mounted athletic monitoring device is to be used for extended periods of time, such as during an athletic event. The above described systems and methods may also enable a sport ball mounted athletic monitoring device to be conveniently and efficiently recharged, in view of the inherent difficulties presented by sport ball material, construction, weight, size, and shape requirements, in a way that does not interfere with the form or function of the sport ball.

A piece of athletic equipment configured for use with one or more of the above described systems and methods may better enable monitoring the motion of the piece of athletic equipment, such as a sport ball, during an athletic activity. An individual engaged in an athletic activity (or another interested person such as a coach, teammate, or spectator) may desire to obtain information about the motion of a piece of the individual's athletic equipment during the course of the athletic activity, and may do so with a piece of athletic equipment suitably powered and charged via the above described systems and methods.

In some embodiments, the such a motion monitoring may include a sensor module. The sensor module may include one or more sensors, and may be physically coupled to a piece of athletic equipment during an athletic activity conducted by an individual. The sensor module may be used to monitor changes in the spatial orientation of a piece of athletic equipment in some embodiments, while the sensor module may be used in combination with predetermined correlation data stored in a data structure to determine a correlation between equipment movement data and an activity metric in other embodiments. The sensor module may be suitably powered and charged via the above described systems and methods.

Although the terms "resonant" and "resonance" are used frequently herein (such as to describe the components named resonant circuits 502 and 702), it is understood that, in some embodiments, the system does not run at the free-resonant frequency of the components, but instead, runs off resonance, e.g. by running at frequencies above or below resonance or at frequencies near resonance. Running at off resonance can be used to avoid several potential problems. At resonance, the voltage can be a maximum, but the circuit can be very susceptible from any load that removes energy from the system. If the drive frequency is very near resonance, minor changes in components, frequencies, or loads can cause the system to pass through the resonance point can invert the polarity of the feedback of the control system, which may potentially cause significant difficulties in control. Keeping the components away from the free-resonant frequency can resolve these issues.

Although specific implementations are presented herein, embodiments of the invention are not limited thereto. For example, embodiments of the invention support any number or combination of the following: using the calibration signal as the ball presence response signal; using the calibration signal instead of placing a crystal on the charger board; using a pair of frequency bands to present the sensed voltage data along with the ball cell charging state; using frequency pulses instead of any other data communication encoding schemes, e.g. frequency, pulse-width modulation (PWM), pulse-position modulation (PPM), serial data streams, fixed bit rates, Manchester (or any other self-clocking data encoding method); selecting another operating frequency and the frequencies for the free-resonant values of the tank circuit components; and selecting other frequencies for the data communication functions from the ball, e.g. those that balance between the ringing on the charging base 200's resonant circuit 702 (caused by the data bits), and the desire to minimize delays for the operator.

In some embodiments, the receiving and transmitting performed by the ball can differ from the receiving and transmitting performed by charging base 200. For example, the charger can sending out a power signal while monitoring the resonant circuit voltage. The ball receives this power signal, and then modulates its load with data bits that show up as short-term variations on the charger's sensed tank voltage. Selecting proper distinctions between these two processes could enhance the communication process.

Additional Exemplary Embodiments

For ease of description, embodiments of the present invention are often described with reference to a sport ball 106, and in particular to a soccer ball 106. The disclosure herein, however, is applicable sports objects (i.e., objects used for an athletic activity) that are balls, as described, and sports objects that are not balls, such as, for example a skateboard, a surfboard, a hockey stick, a hockey puck, a heart rate monitor, an arrow, a discus, a javelin, a bowling pin, munitions, a tennis racket, a golf club, a boomerang, and a kite. The disclosure herein, however, is also applicable to objects that are not sports objects, such as, for example, an aircraft (e.g., model plane).

Various aspects of the present invention, or any parts or functions thereof, may be implemented using hardware, software, firmware, tangible non-transitory computer readable or computer usable storage media having instructions stored thereon, or a combination thereof and may be implemented in one or more computer systems or other processing systems.

Figure 9:
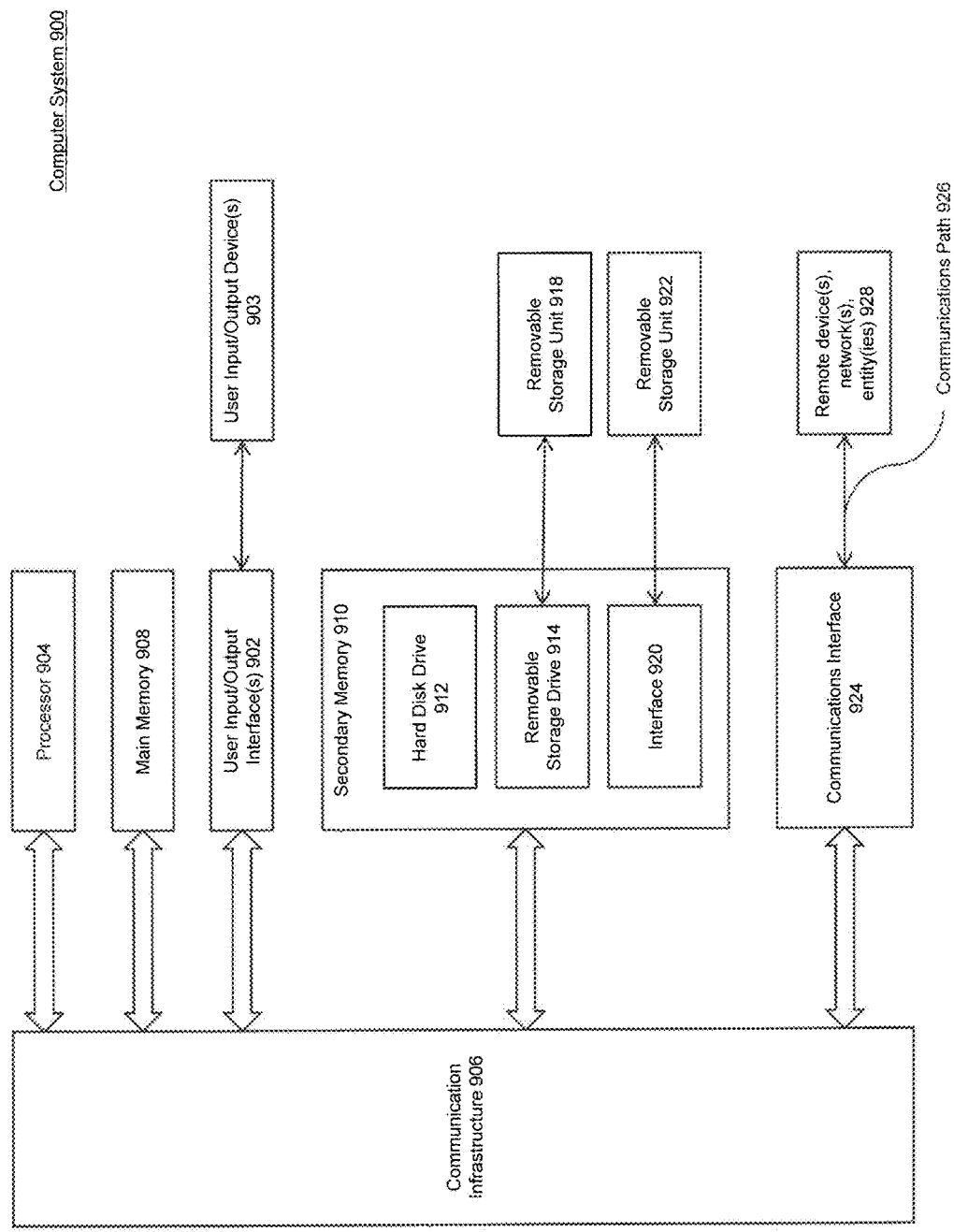
FIG. 9 is an example computer system useful for implementing various embodiments.

Various embodiments can be implemented, for example, using one or more well-known computer systems, such as computer system 900 shown in FIG. 9. Computer system 900 can be any well-known computer capable of performing the functions described herein.

Computer system 900 includes one or more processors (also called central processing units, or CPUs), such as a processor 904. Processor 904 is connected to a communication infrastructure or bus 906.

One or more processors 904 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 900 also includes user input/output device(s) 903, such as monitors, keyboards, pointing devices, etc., that communicate with communication infrastructure 906 through user input/output interface(s) 902.

Computer system 900 also includes a main or primary memory 908, such as random access memory (RAM). Main memory 908 may include one or more levels of cache. Main memory 908 has stored therein control logic (i.e., computer software) and/or data.

Computer system 900 may also include one or more secondary storage devices or memory 910. Secondary memory 910 may include, for example, a hard disk drive 912 and/or a removable storage device or drive 914. Removable storage drive 914 may be a floppy disk drive, a magnetic tape drive, a compact disk drive, an optical storage device, tape backup device, and/or any other storage device/drive.

Removable storage drive 914 may interact with a removable storage unit 918. Removable storage unit 918 includes a computer usable or readable storage device having stored thereon computer software (control logic) and/or data. Removable storage unit 918 may be a floppy disk, magnetic tape, compact disk, DVD, optical storage disk, and/any other computer data storage device. Removable storage drive 914 reads from and/or writes to removable storage unit 918 in a well-known manner.

According to an exemplary embodiment, secondary memory 910 may include other means, instrumentalities or other approaches for allowing computer programs and/or other instructions and/or data to be accessed by computer system 900. Such means, instrumentalities or other approaches may include, for example, a removable storage unit 922 and an interlace 920. Examples of the removable storage unit 922 and the interface 920 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 may further include a communication or network interface 924. Communication interface 924 enables computer system 900 to communicate and interact with any combination of remote devices, remote networks, remote entities, etc. (individually and collectively referenced by reference number 928). For example, communication interface 924 may allow computer system 900 to communicate with remote devices 928 over communications path 926, which may be wired and/or wireless, and which may include any combination of LANs, WANs, the Internet, etc. Control logic and/or data may be transmitted to and from computer system 900 via communication path 926.

In an embodiment, a tangible apparatus or article of manufacture comprising a tangible computer useable or readable medium having control logic (software) stored thereon is also referred to herein as a computer program product or program storage device. This includes, but is not limited to, computer system 900, main memory 908, secondary memory 910, and removable storage units 918 and 922, as well as tangible articles of manufacture embodying any combination of the foregoing. Such control logic, when executed by one or more data processing devices (such as computer system 900), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 9. In particular, embodiments may operate with software, hardware, and/or operating system implementations other than those described herein.

Program products, methods, and systems for inductively charging a sport ball 106 of the present invention can include any software application executed by one or more computing devices. A computing device can be any type of computing device having one or more processors. For example, a computing device can be a workstation, mobile device (e.g., a mobile phone, personal digital assistant, tablet computer, or laptop), computer, server, compute cluster, server farm, game console, set-top box, kiosk, embedded system, a gym machine, a retail system or other device having at least one processor and memory. Embodiments of the present invention may be software executed by a processor, firmware, hardware or any combination thereof in a computing device.

In this document, terms such as "computer program medium" and "computer-usable medium" may be used to generally refer to media such as a removable storage unit or a hard disk installed in hard disk drive. Computer program medium and computer-usable medium may also refer to memories, such as a main memory or a secondary memory, which can be memory semiconductors (e.g., DRAMs, etc.). These computer program products provide software to computer systems of the present invention.

Computer programs (also called computer control logic) may be stored on main memory and/or secondary memory. Computer programs may also be received via a communications interface. Such computer programs, when executed, may enable computer systems of the present invention to implement embodiments described herein. Where embodiments are implemented using software, the software can be stored on a computer program product and loaded into a computer system using, for example, a removable storage drive, an interface, a hard drive, and/or communications interface.

Based on the description herein, a person skilled in the relevant art will recognize that the computer programs, when executed, can enable one or more processors to implement processes described above, such as the steps in the methods illustrated by the figures. In an embodiment, the one or more processors can be part of a computing device incorporated in a clustered computing environment or server farm. Further, in an embodiment, the computing process performed by the clustered computing environment may be carried out across multiple processors located at the same or different locations.

Software of the present invention may be stored on any computer-usable medium. Such software, when executed in one or more data processing device, causes the data processing device to operate as described herein. Embodiments of the invention employ any computer-usable or -readable medium, known now or in the future. Examples of computer-usable mediums include, but are not limited to, primary storage devices (e.g., any type of random access or read only memory), secondary storage devices (e.g., hard drives, floppy disks, CD ROMS, ZIP disks, tapes, magnetic storage devices, optical storage devices, MEMS, nanotechnological storage devices, memory cards or other removable storage devices, etc.), and communication mediums (e.g., wired and wireless communications networks, local area networks, wide area networks, intranets, etc.).

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments for inductive charging system described with reference to the figures will so fully reveal the general nature of the invention that others can, by applying knowledge within the skill of the art, readily modify and/or adapt for various applications such specific embodiments, without undue experimentation, without departing from the general concept of the present invention.

While various embodiments of the present invention have been described above, they have been presented by way of example only, and not limitation. It should be apparent that adaptations and modifications are intended to be within the meaning and range of equivalents of the disclosed embodiments, based on the teaching and guidance presented herein. It therefore will be apparent to one skilled in the art that various changes in form and detail can be made to the embodiments disclosed herein without departing from the spirit and scope of the present invention. The elements of the embodiments presented above are not necessarily mutually exclusive, but may be interchanged to meet various needs as would be appreciated by one of skill in the art.

It is to be understood that the phraseology or terminology used herein is for the purpose of description and not of limitation. The breadth and scope of the present invention should not be limited by any of the above-described exemplary embodiments, but should be defined only in accordance with the following claims and their equivalents.

What is claimed is:

1. A method for inductively charging a power supply of athletic equipment, comprising:
   receiving a presence signal of a charging base;
   generating a calibration signal based on a frequency of a local oscillator of the athletic equipment;
   transmitting the calibration signal to the charging base in response to the receiving of the presence signal, the calibration signal being transmitted via a resonance coil of the athletic equipment;
   receiving initial power from the charging base at a resonant circuit via the resonance coil;
   transmitting charging information to the charging base, wherein the charging information indicates a charging voltage value of the initial power received from the charging base at the resonant circuit and a charging state, the transmitting of the charging information including:
      detecting the charging voltage value and the charging state, the charging state being one of either a normal charging state or a trickle charging state;
      selecting a transmission frequency range that corresponds to the detected charging state from among a first transmission frequency range and a second transmission frequency range, the first transmission frequency range identifying the trickle charging state and the second transmission frequency range identifying the normal charging state;
      encoding the charging voltage value within the selected transmission frequency range; and
      transmitting the charging information at the selected transmission frequency range; and
   transmitting, from the charging base, adjusted power to the resonant circuit after transmitting the charging information.

2. The method of claim 1, wherein the transmitting of the charging information to the charging base comprises modulating a capacitance of the resonant circuit.

3. The method of claim 2, wherein the charging state of the power supply and the charging voltage value are transmitted simultaneously to the charging base.

4. The method of claim 1, further comprising detecting the charging base by receiving the initial power from the charging base.

5. A system, comprising:
   a local oscillator configured to generate a local oscillator (LO) frequency;
   a resonant circuit comprising a resonance coil;
   a memory that stores a plurality of transmission frequency ranges in association with corresponding charging voltage values; and
   at least one processor coupled to the memory and configured to:
      receive a presence signal of a charging base;
      generate a calibration signal based on the LO frequency;
      transmit, via the resonance coil, the calibration signal to the charging base in response to the receiving of the presence signal;
      monitor initial power received from the charging base at the resonant circuit;
      transmit charging information to the charging base, wherein the charging information indicates a charging voltage value of the initial power received from the charging base at the resonant circuit and a charging state, the transmitting of the charging information including:
         detecting the charging voltage value and the charging state, the charging state being one of either a normal charging state or a trickle charging state;
         selecting a transmission frequency range from among a first transmission frequency range and a second transmission frequency range that each correspond to the detected charging state, the first transmission frequency range identifying the trickle charging state and the second transmission frequency range identifying the normal charging state;
         encoding the charging voltage value within the selected transmission frequency range; and
         transmitting the charging information at the selected transmission frequency range;
      transmit, by the charging base, adjusted power to the resonant circuit after transmitting the charging information.

6. The system of claim 5, wherein the at least one processor is further configured to transmit the charging information to the charging base by modulating a capacitance of the resonant circuit.

7. The system of claim 6, wherein the charging state of the power supply and the charging voltage value are transmitted simultaneously to the charging base.

8. The system of claim 5, wherein the at least one processor is further configured to detect the charging base by receiving the initial power at the resonant circuit from the charging base.

9. A non-transitory computer readable device having instructions stored thereon that, when executed by at least one computing device, causes the at least one computing device to perform operations comprising:
   detecting a charging base based on reception of a presence signal from the charging base;

generating a calibration signal based on a frequency of a local oscillator;

transmitting the calibration signal to the charging base in response to detecting the charging base, the calibration signal being transmitted via a resonance coil;

receiving initial power from the charging base at a resonant circuit;

transmitting charging information to the charging base, wherein the charging information indicates a charging voltage value of the initial power received from the charging base at the resonant circuit and a charging state, the transmitting of the charging information including:

detecting the charging voltage value and the charging state, the charging state being one of either a normal charging state or a trickle charging state;

selecting a transmission frequency range that corresponds to the detected charging state from among a first transmission frequency range and a second transmission frequency range, the first transmission frequency range identifying the trickle charging state and the second transmission frequency range identifying the normal charging state;

encoding the charging voltage value within the selected transmission frequency range; and transmitting the charging information at the selected transmission frequency range; and transmitting, from the charging base, adjusted power to the resonant circuit after transmitting the charging information.

10. The non-transitory computer-readable device of claim 9, wherein the transmitting of the charging information to the charging base comprises modulating a capacitance of the resonant circuit.

11. The non-transitory computer-readable device of claim 10, wherein the charging state of the power supply and the charging voltage value are transmitted simultaneously to the charging base.

12. The non-transitory computer-readable device of claim 9, wherein the operations further comprise detecting the charging base by receiving the initial power from the charging base.

13. The method of claim 1, wherein the frequency range corresponds to the charging state and specifies the charging state to the charging base.

14. The method of claim 1, wherein the threshold is associated with a charging state of the power supply.

* * * * *

UNITED STATES PATENT AND TRADEMARK OFFICE
CERTIFICATE OF CORRECTION

PATENT NO. : 10,523,053 B2
APPLICATION NO. : 14/286589
DATED : December 31, 2019
INVENTOR(S) : Munson et al.

Page 1 of 1

It is certified that error appears in the above-identified patent and that said Letters Patent is hereby corrected as shown below:

In the Claims

In Column 20, Claim 5, Line 47, delete "range;" and insert -- range; and --, therefor.

Signed and Sealed this
Third Day of March, 2020

Andrei Iancu
*Director of the United States Patent and Trademark Office*